United States Patent [19]

Nakajima et al.

[11] 4,085,193

[45] Apr. 18, 1978

[54] CATALYTIC PROCESS FOR REDUCING NITROGEN OXIDES TO NITROGEN

[75] Inventors: Fumito Nakajima, Hitachi; Masato Takeuchi, Katsuta; Shimpei Matsuda, Hitachi; Shigeo Uno, Hitachi; Toshikatsu Mori, Hitachi; Yoshihisa Watanabe; Makoto Imanari, both of Ibaragi, all of Japan

[73] Assignees: Mitsubishi Petrochemical Co. Ltd.; Hitachi, Ltd.; Babcock-Hitachi Kabushiki Kaisha, all of Tokyo, Japan

[21] Appl. No.: 531,304

[22] Filed: Dec. 10, 1974

[30] Foreign Application Priority Data

Dec. 12, 1973 Japan .................... 48-137685

[51] Int. Cl.² .................... B01J 8/00; C01B 21/00
[52] U.S. Cl. .................... 423/239; 252/461; 252/469; 252/472; 252/476; 423/351
[58] Field of Search .................... 423/235, 239, 213.2, 423/213.5, 351; 252/461, 469, 472, 476

[56] References Cited

U.S. PATENT DOCUMENTS

| 3,230,034 | 1/1966 | Stiles | 423/213.2 |
|---|---|---|---|
| 3,257,163 | 6/1966 | Stiles | 423/213.2 |
| 3,565,574 | 2/1971 | Kearby et al. | 423/213.2 |
| 3,615,166 | 10/1971 | Hindin et al. | 423/239 |
| 3,844,980 | 10/1974 | Sakai et al. | 252/461 |
| 3,885,020 | 5/1975 | Whelan | 423/239 |
| 3,892,897 | 7/1975 | Rittler | 252/461 |
| 3,900,428 | 8/1975 | Mai et al. | 423/213.2 |
| 3,900,429 | 8/1975 | Komatsa et al. | 423/213.2 |
| 3,903,242 | 9/1975 | Meissner et al. | 423/213.5 |
| 4,003,711 | 1/1977 | Hishinuma | 423/239 A |
| 4,003,978 | 1/1977 | Shiraishi et al. | 423/239 |
| 4,010,238 | 3/1977 | Shiraishi et al. | 423/351 |

FOREIGN PATENT DOCUMENTS

| 662,460 | 1949 | United Kingdom | 423/213.2 |
|---|---|---|---|
| 476,684 | 1936 | United Kingdom | 423/239 |

*Primary Examiner*—O. R. Vertiz
*Assistant Examiner*—Eugene T. Wheelock
*Attorney, Agent, or Firm*—Sherman & Shalloway

[57] ABSTRACT

A catalyst compositions for reducing nitrogen oxide comprising, as its chief ingredient, an intimate mixture of A. titanium (Ti) as component A, with
B. at least one metal selected from the group consisting of molybdenum (Mo), tungsten (W), iron (Fe), vanadium (V), nickel (Ni), cobalt (Co), copper (Cu), chromium (Cr), and uranium (U), as component B, in the form of their oxides, and a process for reducing nitrogen oxides to nitrogen, which comprises contacting a gaseous mixture containing nitrogen oxides and molecular oxygen and a reducing gas with aforesaid catalyst compositions at an elevated temperature.

9 Claims, No Drawings

CATALYTIC PROCESS FOR REDUCING NITROGEN OXIDES TO NITROGEN

This invention relates to a process for reducing nitrogen oxides to nitrogen by treating a gaseous mixture containing the nitrogen oxides and oxygen, and novel catalyst compositions useful for the reduction.

More particularly, the invention relates to a process for reducing nitrogen oxides ($NO_x$), contained in, for example, the waste gases from combustion apparatuses such as various internal combustion engines, or power plant boilers and from factories treating nitric acid and nitrates, or from iron making plants, to convert them to nitrogen; and also to novel catalysts useful for such reduction.

The combustion gases and waste gases as above-mentioned contain various forms of nitrogen oxides, such as, for example, NO, $N_1O_3$, $NO_2$, $N_2O_4$, and $N_2O_5$, which are collectively referred to as nitrogen oxides.

Heretofore, a number of catalysts have been known to be useful for the reduction of nitrogen oxides, e.g., NO and $NO_2$, to nitrogen. For example, copper-containing catalysts such as copper oxide-alumina, copper oxide-silica, and copper-chromite; platinum metals-containing catalysts such as platinum-alumina; and rare earth element containing catalysts such as those containing cerium and lanthanum. According to our reproductive tests, however, those known catalysts invariably possess some weak points in durability, activity, or cost. Concerning the durability, most of the known catalysts are adversely affected by only a minor amount of a sulfur-containing compound such as sulfur dioxide which is found particularly in flue gases. Therefore, no catalyst fully satisfactory for practical use has yet been obtained for reducing and removing nitrogen oxide.

The waste gases discharged from various internal combustion engines, combustion furnaces, or from the factories treating nitric acid and nitrates, as aforesaid, contain various gases, besides the nitorgen oxides such as NO and $NO_2(NO_x)$, for example, oxygen, carbon dioxide, carbon monoxide, nitrogen, steam, and various sulfur oxides, and the like. It has been deisired to convert such minor amounts of nitrogen oxides contained in the gaseous mixtures as described above, to harmless gases, for example, nitrogen, at high selectivity and high conversion. However, this is normally very difficult to achieve.

An object of the invention, therefore, is to provide novel catalyst compositions capable of reducing nitrogen oxides to nitrogen at high selectivity and conversion when treating the gaseous mixtures containing nitrogen oxides and oxygen, and also a novel process for the reduction.

A further object of the invention is to provide the catalyst compositions which are cheap and easy to handle, and a reducing process using such catalysts.

A still further object of the invention is to provide a very practical process which is applicable not only to gaseous mixtures containing the nitrogen oxides in relatively high concentrations, but also to those containing very minor amounts of nitrogen oxides, such as flue gas, to reduce the nitrogen oxides to nitrogen at high conversion; and also the catalyst compositions useful for the process over prolonged periods with stability.

Still another object of the invention is to provide catalyst compositions useful for treating various waste gases containing not only nitrogen oxides but also sulfur oxides with high activity level over prolonged periods, to reduce the nitrogen oxides to nitrogen, in contrast to the majority of conventional catalysts which could not maintain the high activity level for long, in the presence of the sulfur oxides such as sulfur dioxide, sulfuric acid mist, and the like, which is normally contained in the above-mentioned waste gases: and a process for reducing the nitrogen oxide using such novel catalyst compositions.

An additional object of the invention is to provide a process for treating the waste gases containing nitrogen oxides, in which ammonia used as the reducing agent exhibits excellent activity over a wide temperature range and can reduce the nitrogen oxides in the waste gases to harmless gases at a high space velocity (SV), and which contributes to minimize the size of catalytic reduction apparatus, and hence, to reduce the equipment cost.

Still other objects and advantages of the invention will become apparent from the following description.

The foregoing objects and advantages of the invention are accomplished by a catalyst composition the chief ingredient of which is an intimate mixture of A. titanium as component A, and
B. at least one metal selected from the group consisting of molybdenum, tungsten, iron, vanadium, nickel, cobalt, copper, chromium and uranium, as component B, in the form of their oxides; and by a process which comprises contacting a gaseous mixture containing nitrogen oxides and molecular oxygen, and a reducing gas, with the above catalyst composition at an elevated temperature.

The catalyst composition of this invention is a multi-component type catalyst as above, and characterized by containing titanium as one of the essential components (component A'-mainly in the form of oxide). For this reason the catalyst is very cheap and has excellent acid resistance. Furthermore, most of the metals which serve as component B of the subject catalyst (which also are contained mainly in the form of oxide) are inexpensive, and characteristically exhibit excellent activity and acid resistance in combination with titanium.

In order to effect the reduction and removal of nitrogen oxides using the catalyst of this invention, any of the well known reducing agents such as hydrogen, hydrocarbon, carbon monoxide, and ammonia, may be used, but for the treatment of flue gases, the advantages of the catalyst of this invention are most conspicuously exhibited when ammonia is used as the reducing agent.

Normally the combustion gases from which nitrogen oxides are to be removed contain more than several tens moles of oxygen to the amount of the nitrogen oxides. Thus, it is well known that, when hydrogen, carbon monoxide, hydrocarbons, and the like are used as the reducing agent of the nitrogen oxide in such gaseous mixtures, the reducing agent is first consumed by the oxygen, and the consumption of the agent reaches more than several tens molar times that necessary for the reduction of the nitrogen oxide itself. Such loss of the reducing agent can be drastically reduced, by using ammonia or hydrogen sulfide as the reducing agent.

On the other hand, the known catalysts such as platinum or copper directly held on an inert carrier such as alumina shows strong oxidizing activity on ammonia, and at elevated reaction temperatures induces formation of nitrogen oxide originating from the ammonia. Thus the removing efficiency of nitrogen oxide drops rapidly. For this reason in the reducing system of nitrogen oxide with ammonia using the conventional catalyst, the applicable temperature range, within which the removal of nitrogen oxide is effectively practical, is extremely narrow. For the industrial scale practice of the reduction consequently, the reaction temperature must be rigorously controlled, making the procedure objectionably complex.

In clear contrast, when nitrogen oxide is reduced with ammonia in the presence of the catalyst of this invention, the applicable reaction temperature range is as wide as from 150° to 650° C., preferably 150° – 550° C., invariably achieving excellent removal of nitrogen oxide. Thus the catalyst of this invention has an epoch-making performance and extremely high durability. It is believed that the catalyst opened a way for an industrially advantageous process for eliminating the nitrogen oxide in flue gases, using ammonia as the reducing agent.

Hereinafter the invention will be more specifically described.

1. The catalyst composition of the invention:

As already specified, the catalyst composition of the invention is characterized in that it contains, as its chief ingredient, an intimate mixture of
   A. titanium (Ti) as component A, and
   B. at least one metal of the group consisting of molybdenum (Mo), tungsten (W), iron (Fe), vanadium (V), nickel (Ni), cobalt (Co), copper (Cu), chromium (Cr), and uranium (U) as component B in the form of their oxides.

The component B metal to be used in combination with titanium (component A) is normally one of the named metals, but there is no reason to insist on selection of a single metal as such. Specific combinations of two or three of the metals useful as the component B occasionally exhibit satisfactorily high catalytic ability, in combination with titanium (component A), at relatively low temperatures such as 108° – 300° C.

The catalyst composition of the invention advantageously contains to the titanium as component A, the total of the component B metal or metals, at the atomic ratio of 0.01 – 10, particularly 0.01 – 1 (the titanium being 1). However, in the titanium-iron catalyst system, the excellent catalytic ability is exhibited at a widely variable atomic ratio, i.e., to 1 of titanium, that of iron may be varied from 0.05 to 10, in contrasts to the other component B metals. Also, when vanadium or uranium is selected as the component B, the atomic ratio of the metal may be as low as 0.001 – 0.01, to 1 of titanium, equally exhibiting satisfactory activity.

However, as to the component B metals other than iron, vanadium and uranium, the optimum atomic ratio of A:B ranges 1:0.05 – 1.

That the catalyst composition of the invention contains an intimate mixture of titanium (component A) and at least one metal of the component B, in the form of their oxides, means that the metals of the components A and B in the form of oxides are in the finest and most intimate feasible state of mixture. Accordingly, the intimate mixture intended by the invention does not mean the complex system formed by, for example, first making the grains or thin layer of chemically stabilized titanium such as rutile structure of titania, and then causing the grains or thin layer to carry the oxide of component B on the surface thereof.

Of the metals serviceable as the component B in the catalyst composition of the invention, molybdenum, tungsten, iron, and vanadium are particularly preferred.

Combining such metals as the component B with titanium, catalyst compositions of still higher activity and longer life can be obtained.

Again, of the binary catalysts within the scope of this invention, those of titanium-iron type are highly valuable in that the starting materials are inexpensive, they cause no secondary pollution, and exhibit high activity and long life.

Again, upon combining two of the component B metals with titanium (component A), the catalysts of still higher performance and longer life can be obtained. For example, (i) the catalyst composition containing as its chief ingredient an intimate mixture of
   A. titanium as component A,
   $B_1$. tungsten as the first component B, and
   $B_2$. at least one metal selected from the group consisting of vanadium, molybdenum, iron, and uranium, as second component B, in the form of their oxides, and also (ii) the composition composed chiefly of an intimate mixture of
   A. titanium as component A,
   $B_1$. molybdenum as the first component B, and
   $B_2$. at least one metal selected from the group consisting of vanadium and iron, in the form of their oxides, both exhibit excellent catalytic ability.

According to the invention, furthermore, it is discovered that the catalyst life can be drastically improved, particularly under relatively low temperatures (for example, not higher than 300° C.), by combining tin as the component C, with the already specified components A and B.

According to the invention, therefore, the catalyst composition containing as its chief ingredient an intimate mixture of at least three metals, i.e.,
   A. titanium as component A,
   B. at least one metal of the group consisting of molybdenum, tungsten, iron, vanadium, nickel, cobalt, copper, chromium and uranium as the component B, and
   C. tin as component C, in the form of their oxides, is also provided.

Of such ternary catalyst compositions, particularly that containing as the chief ingredient an intimate mixture of at least three metals of
   A. titanium as component A,
   B. vanadium as component B, and
   C. tin as component C,
in the form of their oxides, is advantageous, as it maintains high activity for a long period with stability, at relatively low temperatures such as 180° – 300° C. This catalyst also shows excellent activity and a long life, at high temperatures exceeding 300° C.

When tin is used as component C, the advantageous atomic ratio of the titanium to tin in the catalyst ranges 1:0.0005 – 0.8, preferably 1:0.003 – 0.2

A catalyst composition containing as its chief component an intimate mixture of at least four metals of
   A. titanium as component A,
   $B_1$. vanadium as the first component B,
   $B_2$. tungsten and/or molybdenum as the second component B, and
   C. tin as component C
in the form of their oxides, is also preferred, because of the high activity and long life at the aforesaid relatively low temperatures. That the catalyst shows high activity at such relatively low temperatures as 180° – 300° C., or 200° – 280° C. means that the nitrogen oxide-containing waste gases can be treated at such temperatures according to the invention, reducing the nitrogen oxide to nitrogen at high conversions. Thus such catalyst compositions render the present invention highly advantageous for industrial practice.

If the catalyst composition contains iron and/or vanadium as component B, the iron and/or vanadium may take the form of not only oxide but also sulfate.

Particularly the catalyst compositions containing iron as component B, for example, titanium-iron catalyst system, titanium-iron-molybdenum catalyst system and the like, surprisingly exhibit higher activity when the iron is in the form of sulfate besides the oxide.

Such iron sulfate- and/or vanadyl sulfate-containing catalyst can be obtained by using as the starting material for the later described catalyst preparation, for example, iron sulfate and or vanadyl sulfate.

So far as the intimate mixture of the oxides of titanium as the component A, at least one metal of the component B group, and optionally of tin as component C, is maintained as aforesaid, the catalyst compositions of the invention may be diluted with inert solid carriers such as silica, alumina, silica-alumina, diatomaceous earth, acidic terra abla, activiated clay, various porcelain materials, and zeolites; or may be carried on such inert solid carriers by such means as tumbling granulation. For example, commercial rutile or anatase-form titania has extremely low catalytic action according to our experiments, but it is useful as a solid diluent as above-mentioned. Regardless of which of the specific slid diluent is used, it may occupy as much as approximately 50% or even more of the entire catalyst system.

[2] Preparation of the catalysts

The catalysts of the invention may be prepared by any of the methods known per se, provided that the metals of the aforesaid basic components A and B, and optionally C, can be contained as an intimate mixture in the form of their oxides. Typical methods for making the catalysts may be described, by way of examples, as follows.

1-a: Homogeneous solution method

A homogeneously mixed solution of the components A, B, and optionally C, is concentrated, dried, and then converted to the intimate mixture of the oxides of employed components, by such means as, for example, pyrolysis.

1-b: Coprecipitation method

For example, ammonia water, caustic alkali, alkali carbonate, or the like, is added to the above homogeneously mixed solution to form the mixed precipitate of the compounds of used components which is easily convertible to the corresponding oxides by pyrolysis, such as hydroxide, carbonate, bicarbonate, and the like. Thereafter the precipitate is heated and converted to the intimate mixture of oxides of the used components.

2. Concurrent use of solution and precipitation methods.

A part of the plural catalytic components, for example, component A alone, is precipitated from its solution in advance in the form of, for example, hydroxide, and to which a solution of other component or components is added, followed by thorough stirring and mixing. If necessary, a precipitating agent such as ammonia water or caustic alkali may be further added to the resulting mixture to form a precipitate, and the system may be again mechanically mixed if desired. The system is then dried, and converted to the intimate mixture of oxides of used components, by such means as, for example, pyrolysis.

3. Precipitate-mixing method

The precipitate of each single component in the form convertible to the oxide by pyrolysis with relative ease, such as hydroxide, is formed from the respective single-component solution. The precipitates are then mixed as intimately as possible, dried, and converted to the intimate mixture of oxides of used components by pyrolysis.

According to the invention, the precursors of the critical components A and B, or those of the components A, B, and C, of the catalyst composition are mixed as solutions and/or precipitates of, for example, hydroxides (e.g. hydrous gel), to form an intimately mixed state, and then dried and subjected to a calcining treatment as described later. Thus, the precursors are pyrolyzed, forming an intimate mixture of oxides of the critical components.

The intimate mixture of oxides of the components A and B, or of A, B, and C, as obtained through any of the above-described methods of catalyst preparation is used as catalyst either as it is or after being shaped into the desired size and configuration. For making the shaped catalyst, the intimate mixture of the precursors of the used components may be shaped into the desired size and configuration, optionally dried, and then calcined. It is also permissible to partially pyrolyze the mixture of precursors, shape it, and then calcine the shaped catalyst composition.

The shaping can be effected by any means known per se, such as extrusion molding, tabletting, tumbling granulation, and the like.

The final calcining treatment mentioned above is normally performed at a suitable temperature within the range of 300° – 800° C., preferably 400° – 700° C. When the calcining temperature is below 400° C., particularly below 300° C., the intimate mixture of oxides cannot be satisfactorily formed, and consequently the active catalyst cannot be obtained. Whereas, when the calcining temperature is higher than the above upper limit, sintering takes place to cause loss of effective surface area of the catalyst or partial decomposition and volatilization of the catalytic components, resulting in the reduction of catalytic activity.

For these reasons, the calcining temperature range of 400° – 600° C. is preferred when, for example, vanadium is used as component B, and that of 400° – 650° C. is preferred when molybdenum is selected as component B.

The forms of the starting materials of the components A, B, and optionally C, to be used for the preparation of the catalyst compositions are not critical, but any may be used so far as they are capable of forming the intimate mixture of the precursors of those components in the so far described procedures of catalyst preparation.

Particularly such starting matrials which can form oxides at the aforesaid calcining temperature range, and also can form solution, dispersion, or hydroxides as they are, are preferred. All of such can form the described intimate mixtures of the precursors.

As the starting materials of titanium, essential as the component A, for example, various titanic acids, titanium hydroxide, and various titanium salts such as halides, e.g., tetrachloride and trichloride, titanium sulfate, titanyl sulfate, and the like may be named.

Such titanium salts can be readily converted to the hydroxide, using, for example, ammonia water, caustic alkali, alkali carbonate, and the like.

The calcined rutile- or anatase-form titania cannot be used as a catalytic component of this invention as it is, but by treating it with, for example, hot conc. sulfuric acid, a part or the whole thereof can be converted to titanium sulfate which is useful as a starting material in this invention.

Also organic compounds of titanium such as a titanium alkoxide, e.g., titanium isopropoxide, may be used as the source of titanium for this invention, either as they are or as converted first to the hydroxide by hydrolysis. However, generally the inorganic titanium compounds such as aforesaid titanium salts, hydroxide and titanic acid are preferred, for they are easier to handle and less expensive.

As the starting materials of the components B and C of the present invention, for example, the following may be named.

1. nitrates, sulfates, carbonates, various halides and organic acid salts, and hydroxides of copper, nickel, cobalt, iron, chromium and uranium;
2. halides of chromium, molybdenum, tungsten and vanadium; or, oxyacids such as molybdic acid, tungstic acid, and vanadic acid; or oxyacid salts such as ammonium salts and alkali metal salts of those acids;
3. sulfates, various halides, and hydroxides of tin; salts of stannic acid; organic acid salts of tin such as tin oxalate;
4. oxy salts of vanadium and uranium such as vanadyl sulfate, uranyl nitrate, vanadyl oxalate, uranyl acetate, uranyl chloride, and vanadyl chloride;
5. heteropolyacids and salts thereof of molybdenum and tungsten, such as silico-tungstic acid, silicomolybdic acid, phosphomolybdic acid; their ammonium salts, alkali metal salts, and the like.

The catalyst compositions of the invention can be formulated by using the starting materials of the components A and B, and optionally C, as named above, by any of the methods described above for the catalyst preparation. By way of an example, an embodiment of making a catalyst containing tungsten alone as the component B will be described hereinbelow.

From a predetermined amount of an aqueous titanium tetrachloride solution, titanium hydroxide is precipitated by addition of ammonia water, and the hydroxide is washed thoroughly with distilled water. To the hydroxide, a predetermined amount of an aqueous solution of tungsten source, for example, ammonium paratungstate, is then added and mixed thoroughly. The mixture is extrusion-molded and dried, or dried as it is and tabletted. In the molding step, a part of whole of the catalytic mixture may be pyrolyzed in advance to be converted to a mixture of corresponding oxides, before the extrusion or tabletting step. The shaped product is finally calcined at the temperatures of 300° – 800° C., preferably 400° – 700° C., for approximately 1 to 10 hours, and used in the reducing treatment of this invention.

As so far described in detail, the catalysts of the invention are composed essentially of at least the components A and B, use of two or more of the metals as the component B being permissible. Furthermore, the addition of component C (tin) often contributes to further improve the catalyst life at relatively low temperatures (for example, around 180° – 300° C).

In a majority of the cases, however, presence of minor amount of metals or metal compounds such as oxide, other than the above-named components A, B, and C does not show conspicuously adverse effect, such as the abrupt drop in the catalytic activity. The metals or metal compounds not particularly detrimental to the catalytic action (third component) include such metals and compounds thereof as, shown by symbol of element, Ag, Be, Mg, Zn, B, Al, Y, rare earth elements (e.g. Ce, Th), Si, Nb, Sb, Bi, and Mn. According to the invention, therefore, the catalysts may be prepared from such starting materials of components A, B, and C, which also contain as side component or impurities the metals or metal compounds constituting the third component. For this reason also the catalyst of this invention can be prepared with less expense.

It is normally desirable that the total of the third component in the catalyst should not exceed 0.3, more preferably 0.15, to titanium as 1, in terms of atomic ratio.

The catalyst compositions and methods of their preparation having been described so far, it is noted that according to the invention, the binary catalysts of titanium-molybdenum, titanium-tungsten, and titanium-iron type, or ternary or multi-components catalyst containing the above two components as the chief ingredients, are particularly preferred.

The Ti-Mo and Ti-Fe type catalysts show extremely high activity at the temperatures of approximately 300° – 450° C. Particularly, Ti-Fe type catalysts are prepared from cheap starting materials, exhibit high decomposition activity of the excessive ammonia remaining after its consumption for the reduction of nitrogen oxide, and also are less harmful to human beings.

Again Ti-W type catalysts exhibit particularly high activity at relatively high temperatures, for example 330° – 550° C., and advantageously maintain the high activity level for very long periods of time in the treatment of particularly the waste gases of relatively high sulfur oxides ($SO_x$) concentration. The catalysts are less harmful to human being.

Besides the foregoing, ternary or multi-compounds catalysts containing vanadium as the component B exhibit high activity not only at relatively high temperatures, but also at the relatively low temperatures as, for example, 180° – 300° C., possess high decomposition activity of surplus ammonia, and therefore provide excellent catalyst compositions.

[3] Reduction of nitrogen oxides ($NO_x$)

The nitrogen oxides to be reduced by the invention include the various nitrogen oxides which normally can be collectively expressed as $NO_x$, such as NO, $N_2O_3$, $NO_2$, $N_2O_4$, and $N_2O_5$, while the greatest part of the nitrogen oxide contained in flue gases is nitric oxide (NO).

According to our studies, the presence of oxygen is extremely useful to promote the reduction of nitric oxide (NO) using ammonia as the reducing agent. It is desirable, therefore, that not less than ¼ mol of oxygen per mol of nitric oxide (NO) should be concurrently present. On the other hand, for the reduction of higher order of oxides of nitrogen other than nitric oxide (NO), the concurrent presence of oxygen is not necessarily required.

In the treatment of nitrogen oxide-containing gaseous mixture according to the invention, it is advantageous to add the reducing agent, for example, ammonia, in the amount of approximately 0.5 to 10 molar times the nitrogen oxide in the waste gas, preferably from equimolar to 3 molar times, especially, in the vicinity of equimolar amount.

The gaseous mixture is passed on the catalyst at a space velocity of 1,000 – 100,000 hour, preferably 3,000 – 40,000/hour, the space velocity (SV) being measured under an assumption that the column containing the catalyst bed is at 0° C. and 1 atmosphere, i.e., the normal state -NTP- is the empty column.

The suitable reaction temperature ranges from approximately 150° to 550° C., preferably, 200° – 500° C. The pressure may be atmospheric to approximately 10 kg/cm$^2$, or even higher. When the reaction temperature is below 150° C., the rate of the reaction is too low for practical purpose, while if it is higher than 550° C., the conversion of ammonia to nitrogen oxides increases to make the entire reducing reaction meaningless.

While a number of incidental devices are necessary for the reactor for practicing the subject invention because of the high flow rate of the feed gas, basically the conventional fixed bed, moving bed, or fluidized bed-type reactor can be employed.

The following Examples illustrate the present invention in greater detail.

[Table 1]

Table 1 below shows the typical catalyst compositions, catalyst preparation conditions, reaction conditions and results of reaction in the following Examples.

In Table 1, "CT" stands for a control. The Roman letters stand for the following catalyst compositions and examples of reaction using such catalyst compositions.

| I | Ti-Mo, | II | Ti-W |
|---|---|---|---|
| III | Ti-Fe, | IV | Ti-V |
| V | Ti-Ni | VI | Ti-Co |
| VII | Ti-Cu | VIII | Ti-Cr |
| IX | Ti-U | X | Ti-W-V |
| XI | Ti-W-Mo | XII | Ti-W-Fe |
| XIII | Ti-W-U | XIV | Ti-V-Mo |
| XV | Ti-V-Fe | XVI | Ti-W-Mo-V |
| XVII | Ti-V-Sn | XVIII | Ti-Mo-V-Sn |
| XIX | Ti-W-V-Sn | | |

Table 1-(1)

Typical Examples of Ti-containing Multi-Component Catalyst Compositions

| Examples | | I-1 | II-1 | III-1 | IV-1 | V-1 |
|---|---|---|---|---|---|---|
| 1. Composition (atomic ratio) | | Ti-Mo (9 : 1) | Ti-W (9 : 1) | Ti-Fe (9 : 1) | Ti-V (9.5 : 0.5) | Ti-Ni (8 : 2) |
| 2. Conditions for catalyst preparation | | | | | | |
| (1) Raw material | | TiCl$_4$ (NH$_4$)$_6$Mo$_7$O$_{24}$ 4H$_2$O | TiCl$_4$ 5(NH$_4$)$_2$O . 12WO$_3$ 5H$_2$O | TiCl$_4$ FeSO$_4$ . 7H$_2$O | TiCl$_4$ NH$_4$ . VO$_3$ | TiCl$_4$ Ni(NO$_3$)$_2$6H$_2$O |
| (2) Calcining conditions temp (° C)/time (hr) | | 500/4 | 500/5 | 500/4 | 500/5 | 500/5 |
| 3. Reaction conditions | | | | | | |
| (1) Reaction gas composition | | | | | | |
| NO (ppm) | | 180 – 220 | 700 – 900 | 190 – 210 | 700 | 190 – 210 |
| NH$_3$ (ppm) | | 240 – 260 | 850 – 1100 | 240 – 260 | 700 – 800 | 240 – 260 |
| SO$_2$ (ppm) | | 450 – 550 | — | 240 – 550 | 482 | 450 – 550 |
| O$_2$ (%) | | 2 – 4 | 4 | 2 – 4 | 4 | 2 – 4 |
| CO$_2$ (%) | | 12.5 | — | 12.5 | — | 12.5 |
| H$_2$O (%) | | 15 | — | 15 | 7.14 | 15 |
| N$_2$ (%) | | Balance | Balance | Balance | Balance | Balance |
| (2) S.V. (hr$^{-1}$) | | 10000 | 59000 | 10000 | 50000 | 11800 |
| 4. Result of reaction NO$_x$ reduction ratio (%) | | | | | | |
| Reaction temperature (° C) | 200 | 90.0 | | 91 | 85.0 | 81 |
| | 250 | 97.0 | 48.3 | 98 | 97.0 | 91 |
| | 300 | 99.3 | 83.7 | 100 | ca 100 | 96 |
| | 350 | 100 | 91.2 | 100 | ca 100 | 97 |
| | 400 | 100 | 92.3 | 100 | ca 100 | 97 |
| | 450 | 99.0 | 92.1 | 99 | 98 | 94 |
| | 500 | 94.5 | 90.2 | 96 | 87.0 | — |
| | 550 | 89.0 | — | 88 | — | — |
| | | | particle size 1.5 mm in diameter; other compositions had a particle size of 10–20 Tyler mesh | | | |

Table 1-(2)

Typical Examples of Ti-Containing Multi-Component Catalyst Compositions

| Examples | VI-1 | VII-1 | VIII-1 | IX-1 | CT-1 |
|---|---|---|---|---|---|
| 1. Composition (atomic ratio) | Ti-Co (8 : 2) | Ti-Cu (8 : 2) | Ti-Cr (9 : 1) | Tr-U (9 : 1) | Pt-Al$_2$O$_3$ (0.5 wt%) |
| 2. Conditions for catalyst preparation | | | | | |
| (1) Raw material | TiCl$_4$ Co(NO$_3$)$_2$6H$_2$O | TiCl$_4$ Cr(NO$_3$)$_2$3H$_2$O | TiCl$_4$ Cr(NO$_3$)$_3$9H$_2$O | TiCl$_4$ UO$_2$(NO$_3$)$_2$ . 6H$_2$O | H$_2$PtCl$_6$ |
| (2) Calcining conditions temp. (° C)/time (hr) | 500/5 | 500/5 | 500/4 | 500/5 | 450/3 |
| 3. Reaction gas composition | | | | | |
| NO (ppm) | 190 – 210 | 190 – 210 | 290 – 310 | 700 | 180 – 220 |
| NH$_3$ (ppm) | 240 – 260 | 240 – 260 | 290 – 310 | 700 – 800 | 240 – 260 |
| SO$_2$ (ppm) | 450 – 550 | 450 – 550 | 450 – 550 | 450 | 450 – 550 |
| O$_2$ (%) | 2 – 4 | 2 – 4 | 2 – 4 | 4 | 2 – 4 |
| CO$_2$ (%) | 12.5 | 12.5 | 10 – 13 | — | 12.5 |
| H$_2$O (%) | 15 | 15 | 12 – 16 | 6 –4 | 15 |
| N$_2$ (%) | Balance | Balance | Balance | Balance | Balance |
| (2) S. V. (hr$^{-1}$) | 11800 | 11800 | 10000 | 30000 | 11800 |
| 4. Result of reaction NO$_x$ reduction ratio (%) | | | | | 100° C 68 150° C 97 |

Table 1-(2)-continued

| Examples | | VI-1 | VII-1 | VIII-1 | IX-1 | CT-1 |
|---|---|---|---|---|---|---|
| | | Typical Examples of Ti-Containing Multi-Component Catalyst Compositions | | | | |
| Reaction temperature (° C) | 200 | 77 | 84 | 88 | 88.2 | 91.5 |
| | 250 | 89 | 93 | 96.5 | 98.1 | 65 |
| | 300 | 97 | 98 | 99 | 100 | 24 |
| | 350 | 99 | 100 | 100 | 100 | 0 |
| | 400 | 97 | 99 | 100 | 100 | — |
| | 450 | 97 | 94 | 98.6 | 100 | — |
| | 500 | — | 82 | 93.5 | 100 | — |
| | 550 | — | — | — | 96.6 | — |

Table 1-(3)

| Examples | | X-1 | XI-1 | XII-1 | XIII-1 | XV-1 |
|---|---|---|---|---|---|---|
| | | Typical Examples of Ti-Containing Multi-Component Catalyst Compositions | | | | |
| 1. Composition (atomic ratio) | | Ti-W-V (9 : 0.5 : 0.5) | Ti-W-Mo (9 : 0.5 : 0.5) | Ti-W-Fe (8 : 1 : 1) | Ti-W-U (8.5 : 0.5 : 1) | Ti-V-Mo (9 : 0.5 : 0.5) |
| 2. Conditions for catalyst preparation | | | | | | |
| (1) Raw material | | $TiCl_4 \cdot NH_4VO_3$ $5(NH_4)_2O \cdot 12WO_3 \cdot 5H_2O$ | $TiCl_4$ $5(NH_4)_2O \cdot 12WO_3 \cdot 5H_2O$ $(NH_4)_6Mo_7O_{24} \cdot 4H_2O$ | $TiCl_4$ $5(NH_4)_2O \cdot 12WO_3 \cdot 5H_2O$ $FeSO_4 \cdot 7H_2O$ | $TiCl_4$ $5(NH_4)_2O \cdot 12WO_3 \cdot 5H_2O$ $UO_2(NO_3)_2 \cdot 6H_2O$ | $TiO(OH)_2$ $NH_4VO_3$ $(NH_4)_6Mo_7O_{24} \cdot 4H_2O$ |
| (2) Calcining conditions temp (° C)/time (hr) | | 500/5 | 500/5 | 500/5 | 500/5 | 500/2 |
| 3. Reaction conditions | | | | | | |
| (1) Reaction gas composition | | | | | | |
| NO (ppm) | | 700 | 700 | 700 | 600 | 280 – 320 |
| $NH_3$ (ppm) | | 700 – 800 | 700 – 800 | 700 – 800 | 800 | 280 – 320 |
| $SO_2$ (ppm) | | 482 | 482 | 482 | 500 | 450 – 550 |
| $O_2$ (%) | | 4 | 4 | 4 | 4 | 2 – 4 |
| $CO_2$ (%) | | — | — | — | — | 10 – 13 |
| $H_2O$ (%) | | 7.14 | 7.14 | 7.14 | 6 | — |
| $N_2$ (%) | | Balance | Balance | Balance | Balance | Balance |
| (2) S. V. ($hr^{-1}$) | | 50,000 | 50,000 | 50,000 | 30,000 | 10,000 |
| 4. Result of reaction $NO_x$ reduction ratio (%) | | | | | | |
| Reaction temperature (° C) | 200 | 98.3 | 97.1 | 88.7 | 89.9 | 87.5 |
| | 250 | 99.7 | 94.8 | 97.3 | 99.1 | 95.0 |
| | 300 | ca 100 | ca 100 | 99.7 | 100 | 99.0 |
| | 350 | ca 100 | ca 100 | 100 | 100 | 100 |
| | 400 | ca 100 | ca 100 | 100 | 100 | 100 |
| | 450 | 98.6 | 98.9 | 99.0 | 100 | 95.5 |
| | 500 | 90.0 | 89.8 | 90.7 | 100 | 85 |
| | 550 | — | — | — | 100 | — |

Table 1-(4)

| Examples | | XV-1 | XVI-1 | XVII-1 | XVIII-1 | XIX-1 |
|---|---|---|---|---|---|---|
| | | Typical Examples of Ti-Containing Multi-Component Catalyst Compositions | | | | |
| 1. Composition (atomic ratio) | | Ti-V-Fe (9 : 0.5 : 0.5) | Ti-W-Mo-V (8.5 : 0.5 : 0.5 : 0.5) | Ti-V-Sn (9.45 : 0.5 : 0.05) | Ti-Mo-V-Sn (8.95 : 0.5 : 0.5 : 0.05) | Ti-W-V-Sn (8.95 : 0.5 : 0.5 : 0.05) |
| 2. Conditions for catalyst preparation | | | | | | |
| (1) Raw material | | $TiO(OH)_2$ $NH_4VO_3$ $FeSO_4 \cdot 7H_2O$ | $TiCl_4$ $5(NH_4)_2O \cdot 12WO_3 \cdot 5H_2O$ $(NH_4)_6Mo_7O_{24} \cdot 4H_2O$ $NH_4VO_3$ | $TiCl_4$ $NH_4VO_3$ $SnSO_4$ | $TiCl_4$ $(NH_4)_6Mo_7O_{22} \cdot 4H_2O$ $NH_4VO_3$ $SnSO_4$ | $TiCl_4$ $5(NH_4)_2O \cdot 12WO_3 \cdot 5H_2O$ $NH_4VO_3$ $SnCl_4 \cdot 5H_2O$ |
| (2) Calcining conditions temp (° C)/time (hr) | | 500/2 | 500/5 | 500/5 | 500/5 | 500/5 |
| 3. Reaction Condition | | | | | | |
| (1) Reaction gas composition | | | | | | |
| NO (ppm) | | 280 – 320 | 700 | 630 | 700 | 640 |
| $NH_3$ (ppm) | | 280 – 320 | 700 – 800 | 920 | 1000 | 670 |
| $SO_2$ (ppm) | | 450 – 550 | 482 | 370 | 440 | 400 |
| $O_2$ (%) | | 2 – 4 | 4 | 4 | 4 | 4 |
| $CO_2$ (%) | | — | — | — | — | — |
| $H_2O$ (%) | | — | 7.14 | 6.4 | 6.7 | 6.25 |
| $N_2$ (%) | | Balance | Balance | Balance | balance | Balance |
| (2) S. V. ($hr^{-1}$) | | 50000 | 50000 | 50000 | 50000 | 50000 |
| 4. Result of reaction $NO_x$ reduction ratio (%) | | | | | | |
| Reaction temperature (° C) | 200 | 80 | 91 | 90.3 | 91.7 | 95.7 |
| | 250 | 95 | 99.7 | 100 | 100 | 99.6 |
| | 300 | 99 | ca 100 | 100 | 100 | 100 |
| | 350 | 99 | ca 100 | 100 | 100 | 100 |
| | 400 | 98 | ca 100 | 100 | 100 | 100 |
| | 450 | 92 | ca 100 | 100 | 100 | 100 |
| | 500 | 78 | 70.0 | 97.7 | 93.1 | 92.6 |
| | 550 | — | — | — | — | — |

[Table 2]

Table 2 shows the results of reactions carried out under the following conditions using a catalyst composition consisting of titanium as component A of this invention and a second component outside the scope of the present invention in a proportion such that the ratio of titanium to the second component is 9 to 1 (metallic atomic ratio).

Reaction conditions

SV = 20,000 hr$^{-1}$
Reaction temperature = 350° C.
Composition of feed gas:

| | |
|---|---|
| NO = 600 ppm | O$_2$ = 4% |
| NH$_3$ = 900 ppm | H$_2$O = 6.3% |
| SO$_2$ = 450 ppm | N$_2$ = balance |

Table 2

| Run No. | Catalyst* | Material for second component | NO$_x$ reduction ratio (%) |
|---|---|---|---|
| CT - 1 | Ti-Zr | Zr(SO$_4$)$_2$ . 4H$_2$O | 13.3 |
| 2 | Ti-Sn | SnSO$_4$ | 32.5 |
| 3 | Ti-Mn | MnSO$_4$ . 4H$_2$O | 28.9 |
| 4 | Ti-Tn | Th(SO$_4$)$_2$nH$_2$O | 10.0 |
| 5 | Ti-Li | LiSO$_4$ . H$_2$O | 3.9 |
| 6 | Ti-Mg | MgSO$_4$ . 7H$_2$O | 5.8 |
| 7 | Ti-Zn | ZnSO$_4$ . 4H$_2$O | 3.4 |
| 8 | Ti-Al | Al$_2$(SO$_4$)$_3$ | 13.4 |
| 9 | Ti-Tl | Tl$_2$SO$_4$ | 2.2 |
| 10 | Ti-In | In$_2$(SO$_4$)$_3$ . 9H$_2$O | 8.5 |
| 11 | Ti-Bi | Bi$_2$(SO$_4$)$_3$ | 4.3 |

*The method for catalyst preparation was the same as that used in Example II-1, and the calcination was performed at 500° C. for 5 hours.

It can be seen from the results shown in Table 2 that these control catalysts had very low activities with an NO$_x$ reduction rate of less than 50%.

[Table 3]

Table 3 shows the results of reductions of nitrogen oxide-containing gases using a catalyst composition consisting of catalyst components A and B of this invention and a small amount of a third metallic component other than the component C used in this invention.

The raw materials for the third component, the reaction temperature and the NO$_x$ reduction rate are shown in Table 3. These NO$_x$ reduction rates demonstrate that silver, beryllium, magnesium, zinc, yttrium, manganese, niobium, cerium, thorium, boron, aluminum, zirconium, bismuth and antimony, when used in small amounts as the third component, scarcely affect the catalytic activities, and therefore can be added to the catalyst compositions of this invention. On the other hand, the addition of the alkali metal even in an amount of about 6 mol% based on titanium results in a considerable reduction in catalytic activity.

All runs shown in Table 3 were carried out at a space velocity (SV) of 20,000 hr$^{-1}$ using a feed gaseous mixture consisting of 600 ppm of NO, 900 ppm of NH$_3$, 450 ppm of SO$_2$, 6.3% of H$_2$O, 4% of O$_2$ and the balance being N$_2$.

Table 3

| Run No. | Composition of catalyst | Material for third component | Reaction temperature (° C) | NO$_x$ reduction rate (%) |
|---|---|---|---|---|
| Run - 1 | Ti - W - Na 8.9  1  0.1 | NaNO$_3$ | 350 | 86.6 |
| CT - 12 | Ti - W - Na 8.5  1  0.5 | " | " | 11.0 |
| 13 | Ti - W - K | KNO$_3$ | " | 7.2 |
| | 8.6 0.93 0.47 | | | |
| Run - 2 | Ti - W - Ag 8.9  1  0.1 | AgNO$_3$ | " | 97.8 |
| 3 | Ti - W - Be 8.9  1  0.1 | Be(NO$_3$)$_2$ . 3H$_2$O | " | 96.5 |
| 4 | Ti - W - Mg 8.9  1  0.1 | Mg(NO$_3$)$_2$ . 6H$_2$O | " | 90.4 |
| 5 | Ti - W - Zn 8.9  1  0.1 | Zn(NO$_3$)$_2$ . 6H$_2$O | " | 93.1 |
| 6 | Ti - W - Y 8.9  1  0.1 | YCl$_3$ | " | 93.8 |
| 7 | Ti - W - Mn 8.9  1  0.1 | Mn(NO$_3$)$_2$6H$_2$O | " | 98.9 |
| 8 | Ti - W - Ce 8  1  1 | Ce(NO$_3$)$_2$6H$_2$O | " | 87.8 |
| 9 | Ti - W - Nb 8.9  1  0.1 | Nb(OH)$_n$ | " | 96.8 |
| 10 | Ti - W - Th 8.9  1  0.1 | Th(NO$_3$)$_4$4H$_2$O | " | 96.6 |
| 11 | Ti - W - B 8.9  1  0.1 | H$_3$BO$_3$ | " | 97.3 |
| 12 | Ti - W - Al 8.9  1  0.1 | Al(NO$_3$)$_3$9H$_2$O | " | 96.2 |
| 13 | Ti - W - Zr 8.9  1  0.1 | ZrO(NO$_3$)$_2$ . 2H$_2$O | " | 96.1 |
| 14 | Ti - W - Bi 8.9  1  0.1 | Bi(NO$_3$)$_3$5H$_2$O | 350 | 92.3 |
| 15 | Ti - W - Sb 8.9  1  0.1 | SbCl$_3$ | " | 95.5 |
| 16 | Ti - U - Nb 9  0.5  0.5 | Nb(OH)$_n$ | 300 | 99.7 |
| 17 | Ti - U - Mn 9  0.5  0.5 | Mn(NO$_3$)$_2$6H$_2$O | " | 99.9 |
| 18 | Ti - V - Mn 9  0.5  0.5 | Mn(NO$_3$)$_2$6H$_2$O | 250 | 94.7 |
| 19 | Ti - Fe - Sb 5  5  0.5 | SbCl$_3$ | 350 | 87.5 |

[Table 4]

Table 4 illustrates the necessity of using titanium as component A, using combinations of component B with elements other than component A or combinations of component B elements with each other. It also shows the importance of intimately mixing titanium with component B using as an example a commercially available pigment-grade titanium oxide as raw material. The catalysts shown in Table 4 were prepared by the following methods.

[CT II-1] (Al-W catalyst)

281.4 g of aluminum nitrate [Al(NO$_3$)$_3$.9H$_2$O] was dissolved in 500 ml. of water, and the solution was neutralized with 3N ammonia water to form a precipitate of aluminum hydroxide. The precipitate was thoroughly washed, and then thoroughly mixed with a solution of 21.8 g of ammonium para-tungstate [5(NH$_4$)$_2$0.12WO$_3$.5H$_2$O] in 600 ml. of water. With stirring, the mixture was evaporated and concentrated. Then, 1% by weight of polyethylene oxide (trade name Alkox E-30, a product of Meisei Kagaku Kogyo K.K.) was added, and the mixture was milled in the wet state and extruded into pellets with a diameter of 1.5 mm. The resulting pellets were calcined at 500° C. for 5 hours in a muffle furnace.

[CT II-2] (Zr - W catalyst)

133.6 g of zirconyl nitrate [ZrO(NO$_3$)$_2$.2H$_2$O] was dissolved in 500 ml. of water, and the solution was adjusted to pH 3 with 3N ammonia water. The resulting precipitate was washed, and filtered. Then, a solution of 14.5 g of ammonium para-tungstate [5(NH$_4$)$_2$0.12WO$_3$.5H$_2$O] in 300 ml. of water was added.

The mixture was then processed in the same way as in the preparation of the catalyst CT II-1.

[CT IV-1] (Al-V catalyst)

A solution of 7.0 g of ammonium metavanadate [NH$_4$VO$_3$] in 400 ml. of water was added to 73.3 g of aluminum hydroxide [Al(OH)$_3$]. The mixture was treated and processed in the same way as in the preparation of the catalyst of CT II-1.

[CT I-1] (Al-Mo catalyst)

A solution of 17.7 g of ammonium paramolybdate (NH$_4$)$_6$MoO$_{24}$.4H$_2$O] in 200 ml. of hot water was added to 70.2 g of aluminum hydroxide [Al(OH)$_3$]. The solution was treated and processed in the same way as in the preparation of the catalyst of CT II-1.

[CT II-3] (Ni-W catalyst)

A 1N aqueous solution of potassium hydroxide was added to a solution of 290.8 g of nickel nitrate [Ni(-NO$_3$)$_2$.6H$_2$O] in 500 ml. of distilled water, and a precipitate was formed at a pH of 9. The precipitate was separated by filtration and thoroughly washed. A solution of 29 g of ammonium paratungstate [5(NH$_4$)$_2$O.12WO$_3$.5H$_2$O] in 700 ml. of distilled water was added to the resulting cake, and the mixture was treated and processed in the same way as in the preparation of the catalyst of CT II-1.

[CT II-4] (Ti-W catalyst, using anatase-type titanium oxide)

A solution of 23.2 g of ammonium paratungstate [5(NH$_4$)$_2$O.12WO$_3$.5H$_2$O] in 500 ml. of distilled water was added to 64 g of titanium oxide (TiO$_2$, anatase type, W-10 a tradename for a product of Ishihara Sangyo Kabushiki Kaisha). They were thoroughly mixed with stirring, and concentrated to form an extrudable paste. The paste was extruded into pellets with a diameter of 1.5 mm, dried, and then calcined at 500° C. for 5 hours.

[CT II-5] (Ti - W catalyst, using rutile type titanium oxide)

The same procedure as in the preparation of the catalyst of CT II-4 was repeated except that commercially available titanium oxide [TiO$_2$, rutile type, KR-380 a tradename for a product of Titan Kogyo Kabushiki Kaisha] as used.

Using each of the above catalysts, a feed gaseous mixture consisting of 700 to 900 ppm of NO, 850 to 1100 pp. of NH$_3$, 4% of O$_2$ and the balance being N$_2$ was reacted at a space velocity (SV) of 59000 hr$^{-1}$. For comparison, the above reaction was carried out using the catalyst of Example II-1 (a typical example of the Ti - W catalyst). The results obtained are shown in Table 4.

Table 4

| Run No. | Catalyst | Composition (metallic atomic ratio) | NO$_x$ reduction rate (%) 350° C | 400° C |
|---|---|---|---|---|
| 1 | Example II-1 | Ti : W = 9 : 1 | 91.2 | 92.3 |
| 2 | CT - II - 1 | Al : W = 9 : 1 | 4.0 | 5.0 |
| 3 | CT - II - 2 | Zr : W = 9 : 1 | 14.2 | 40.1 |
| 4 | CT - IV - 1 | Al:V = 9.4:0.6 | 13 | 18 |
| 5 | CT - I - 1 | Al : Mo = 9 : 1 | 19 | 26 |
| 6 | CT - II - 3 | Ni : W = 9 : 1 | 7.0 | 8.1 |
| 7 | CT - II - 4 | Ti : W = 9 : 1 | 26.0 | 49.0 |
| 8 | CT - II - 5 | Ti : W = 9 : 1 | 9.3 | 11.0 |

It can be seen from the results shown in Table 4 that even when other elements than titanium which are frequently used as carriers, such as alumina or zirconia, are combined, good results cannot be obtained. It is clear from this that titanium does not merely function as a carrier, but exhibits catalytic activity in cooperation with component B. Moreover, as is clear from CT II-4 and CT II-5, commercially available pigment-grade titanium oxides as such exhibit only low activity. Both the anatase-type titanium oxide (W - 10 and the rutile-type titanium oxide (KR-380) used in these controls are of pigment grade, and consist of well grown crystals as a result of having been calcined at a temperature as high as about 800° C. Even when a tungstate is admixed with such a titanium oxide, an intimate mixture of titanium and tungsten cannot be obtained. This can be demonstrated from the X-ray analysis of these catalysts. In the catalyst of Example II-1, the crystals of anatase-type titanium oxide are not in the grown state, and no peak ascribable to the crystals of tungsten oxide appears. On the other hand, in the catalysts of CT II-4 and CT II-5, the anatase-type titanium oxide and the rutile-type titanium oxide are considerably crystallized, and a peak ascribable to the crystals of tungsten oxide markedly appears. Accordingly, it is clear that the titanium exists separately from the tungsten.

Since such a catalyst has a low activity, it is evident that intimate mixing of titanium with component B is of utmost importance.

I. Ti - Mo TYPE CATALYSTS

EXAMPLE I-1

500 g of titanium tetrachloride (TiCl$_4$) was dissolved in about 1 liter of distilled water, and the resulting solution was neutralized with about 2 liters of 5N aqueous ammonia to form a precipitate. The resulting precipitate was thoroughly washed by decantation, and then filtered. A solution of 54 g of ammonium paramolybdate in 500 ml. of hot water was added to the precipitate, and they were mixed well in a mixer. The resulting slurry was dried, and then mixed thoroughly with about 5 g of graphite. The resulting mixture was molded into tablets each having a diameter of 6 mm and a height of 6 mm. The molded tablets were calcined at 500° C. for 4 hours in a muffle furnace. The resulting catalyst contained titanium and molybdenum as oxides, and an atomic ratio of Ti:Mo of 9:1. The catalyst was pulverized, and particles having a particle size of 10 to 20 mesh were collected, and used for the reaction.

In order to compare the performance of this catalyst with that of platinum-type catalysts generally used as catalysts for removing NO$_x$, the following comparative catalyst was prepared.

5 ml. of an aqueous solution of hexachloroplatinic acid (10 g Pt/100 ml.) was diluted in water to adjust the total amount of the solution to 70 ml. The resulting solution was impregnated in 100 g of an active alumina carrier pulverized to 10–20 mesh, and dried at 120° C. for 5 hours. The dried product was reduced in a hydrogen stream at 450° C. for 3 hours. This catalyst contained 0.5% by weight of platinum.

A reaction tube made of quartz glass having an inside diameter of 20 mm and including a thermocouple protective tube made of quartz with a diameter of 5 mm was heated in an electric furnace, and the temperature was measured by a thermocouple. The above catalyst particles were packed in the central part of the reaction tube in an amount of about 4 ml, and $NO_x$ was reduced with ammonia over this catalyst. The feed gas consisted of 180 to 220 ppm of NO, 450 to 550 ppm of $SO_2$, 240 to 260 ppm of $NH_3$, 2 to 4% of $O_2$, 12.5% of $CO_2$, 15% of steam, and the balance being $N_2$.

This gas was passed through the catalyst layer at a space velocity (to be abbreviated to SV) of 10,000 hr$^{-1}$, and the performance of the catalyst of this invention was compared with that of the comparative catalyst. The results are shown in Table 1.

$NO_x$ reduction rate is defined as follows:

$$NO_x \text{ reduction rate} = \left(1 - \frac{NO_x \text{ in exit gas (ppm)}}{NO_x \text{ in the feed gas (ppm)}}\right) \times 100$$

As is shown in Table 1, the comparative catalyst of CT-1 had a superior activity at low temperatures, but when the temperature exceeds 200° C., oxidation of ammonia occurs, and the $NO_x$ reduction rate decreases rapidly. Furthermore, when the temperature exceeds 350° C., the concentration of $NO_x$ at the outlet of the reaction tube becomes higher than the concentration at the inlet. Accordingly, in order to maintain the $NO_x$ reduction at more than 90% for example, the comparative catalyst must be used at a reaction temperature within a narrow range of 120° to 190° C. On the other hand, the catalyst of this invention gives an $NO_x$ reduction rate of more than 90% at a temperature of 200° to 500° C. This is very advantageous for operating plants.

EXAMPLES I-2

This Example illustrate the performances of catalysts with varying titanium/molybdenum ratios. The same reaction as in Example I-1 was carried out at a space velocity of 50,000 hr$^{-1}$ using catalysts prepared by the same method as in Example I-1 except that the ratio of titanium to molybdenum was changed.

The results obtained are shown in Table I-1.

Table I-1

| Run No. | CT I-2 | 1 | 2 | 3 | 4 | 5 |
|---|---|---|---|---|---|---|
| Reaction temperature (° C) | Ti:Mo atomic ratio | | | $NO_x$ reduction rate (%) | | |
| | 1:9 | 5:5 | 8:2 | 9:1 | 9.5:0.5 | 9.9:0.1 |
| 200 | 60.0 | 73.0 | 80.6 | 78.0 | 73.2 | 35.7 |
| 250 | 66.3 | 80.1 | 87.2 | 86.0 | 84.1 | 58.2 |
| 300 | 65.7 | 83.5 | 93.0 | 93.5 | 91.8 | 78.4 |
| 350 | 62.1 | 83.9 | 96.1 | 96.7 | 94.0 | 91.2 |
| 400 | 57.0 | 81.0 | 94.4 | 98.2 | 98.4 | 96.5 |
| 450 | 43.2 | 78.7 | 92.1 | 95.2 | 98.2 | 96.3 |
| 500 | 28.9 | 73.3 | 85.0 | 90.0 | 93.0 | 94.2 |

[CT I-3]

This example illustrates the use of titanium oxide alone. Titanium hydroxide prepared in the same way as in Example I-1 was dried, and then mixed with graphite. The mixture was molded into tablets having a diameter of 6 mm and a height of 6 mm. The molded tablets were calcined at 500° C. for 4 hours in a muffle furnace. Using the resulting catalyst, the reaction was carried out under the conditions shown in Example I-2. The results are tabulated below.

| Reaction temperature (° C) | $NO_x$ reduction rate (%) |
|---|---|
| 200 | 2.5 |
| 250 | 6.4 |
| 300 | 19.3 |
| 350 | 40.0 |
| 400 | 80.3 |
| 450 | 93.3 |
| 500 | 95.2 |

Example I-3

The same feed gas as used in Example I-1 was passed at a space velocity of 50,000 hr$^{-1}$ over a catalyst prepared in the same way as in Example I-1 except that the calcination temperature was changed as shown in Table I-2.

Table I-2

| Run No. | 1 | 2 |
|---|---|---|
| Calcining temperature (° C) | 400 | 600 |
| | $NO_x$ reduction rate (%) | |
| 200 | 79.0 | 79.3 |
| 250 | 89.2 | 87.1 |
| 300 | 94.3 | 94.0 |
| 350 | 95.8 | 96.0 |
| 400 | 96.0 | 98.1 |
| 450 | 93.3 | 94.0 |
| 500 | 84.3 | 88.0 |

EXAMPLE I-4

A solution of 54 g of ammonium paramolybdate in 500 ml. of hot water was added to and thoroughly mixed with 220 g (as $TiO_2$) of a slurry of metatitanic acid [$TiO(OH)_2$], and then the mixture was dried. To the resulting powder were added 1% by weight of polyethylene oxide (Alkox E-30, a trade name for a product of Meisei Kagaku Kogyo K.K.) and about 100 ml. of water. The mixture was milled in the wet state for 30 minutes, and then extruded into pellets having a diameter of 6 mm. The molded product was calcined at 500° C. for 4 hours. The resulting catalyst had an atomic ratio Ti:Mo of 9:1. Using this catalyst, a feed gas having the same composition as in Example I-1 was reacted at a space velocity of 50,000 hr$^{-1}$. The results obtained are shown in Table I-3.

EXAMPLE I-5

This Example illustrates the use of titanium sulfate as a raw material for titanium. 350 g of titanium sulfate having a concentration of 24% by weight as $Ti(SO_4)_2$ was diluted with distilled water to an amount of about 1 liter. The resulting solution was added dropwise to aqueous ammonia to form a precipitate. The precipitate was washed well with water, and then filtered. 15 g of a powder of molybdic acid ($H_2MoO_4 \cdot H_2O$) was added to the precipitate, and they were mixed for 5 hours in a mixer. Then, about 2% by weight of graphite was added, and mixed with the resulting mixture. The mixture was molded into tablets each having a diameter of 6 mm and a height of 6 mm. The resulting molded product was calcined at 500° C. for 4 hours. The resulting catalyst had an atomic ratio Ti:Mo of 8:2. Using this catalyst, a gas having the same composition as in Example I-1 was reacted at a space velocity of 50,000 hr$^{-1}$. The results are shown in Table I-3.

EXAMPLE I-6

This Example illustrates the use of titanium oxide ($TiO_2$, anatase type, A-110, a product of Sakai Chemical Co., Ltd.) as a raw material of titanium. 250 g of 36N sulfuric acid was added to 100 g of the titanium oxide, and they were stirred. The resulting slurry was heated at about 200° C. for 2 hours. The solution was cooled, and then neutralized with ammonia. The product was washed well and filtered. The resulting cake was mixed thoroughly with a solution of 25 g of ammonium paramolybdate in 250 ml. of hot water, and then the mixture was dried. The mixture was then molded and calcined in the same way as in Example I-5. The resulting catalyst had an atomic ratio Ti:Mo of 9:1. Using this catalyst, a feed gas having the same composition as shown in Example I-1 was reacted at a space velocity of 50,000 $hr^{-1}$. The results are shown in Table I-3.

EXAMPLE I-7

This Example illustrates a catalyst composed of titanium and molybdenum supported on a carrier. 24 g of titanium tetrachloride was dissolved in 50 ml. of water, and the solution was mixed with a solution of 2.6 g of ammonium paramolybdate in 20 ml. of aqueous hydrogen peroxide. 30 g of a silica-alumina carrier (N-631, a product of Nikki Kagaku K.K.) was impregnated with the resulting mixed solution, and calcined at 300° C. This procedure was repeated three times, and finally the calcined product was calcined at 500° C. for 4 hours. The resulting catalyst contained titanium and molybdenum in an atomic ratio of 9:1, and $TiO_2$ occupied 25% of the total weight of the catalyst. Using this catalyst, a gas having the same composition as in Example I-1 was reacted at a space velocity of 50,000 $hr^{-1}$. The results are shown in Table I-3.

Table I-3

| Examples Nos. | I-4 | I-5 | I-6 | I-7 |
|---|---|---|---|---|
| Reaction temperature (° C) | $NO_x$ reduction rate (%) | | | |
| 200 | 78.5 | 77.1 | 76.8 | 73.0 |
| 250 | 88.2 | 84.3 | 87.1 | 82.5 |
| 300 | 94.0 | 93.0 | 94.2 | 88.9 |
| 350 | 96.0 | 97.2 | 95.6 | 90.4 |
| 400 | 97.5 | 99.0 | 96.2 | 92.7 |
| 450 | 96.8 | 94.1 | 94.0 | 92.7 |
| 500 | 92.0 | 88.2 | 91.9 | 85.9 |

Example I-8

Example 1 was repeated except that the space velocity was varied. The results obtained are shown in Table I-4.

Table I-4

| Run No. SV ($hr^{-1}$) | 1 5,000 | 2 20,000 | 3 100,000 |
|---|---|---|---|
| Reaction temperature (° C) | $NO_x$ reduction rate (%) | | |
| 200 | 92.4 | 85.2 | 56.2 |
| 250 | 98.8 | 93.5 | 71.8 |
| 300 | ca. 100 | 98.2 | 82.0 |
| 350 | ca. 100 | ca. 100 | 87.2 |
| 400 | ca. 100 | ca. 100 | 88.9 |
| 450 | ca. 100 | 99 | 86.3 |
| 500 | 98.7 | 92.0 | 78.0 |

EXAMPLE I-9

This Example illustrates the durability of the catalyst to $SO_2$ and $SO_3$. $SO_3$ used was obtained by heating and evaporating dilute sulfuric acid, and its amount was 10 to 100 times the amount of it contained in boiler exhaust gases. A feed gas of the following composition was reacted at a temperature of 350° C. and a space velocity of 50,000 $hr^{-1}$ using each of the catalysts of Examples I-1, I-4, I-5, I-6 and I-7.

| Composition of the Feed gas | |
|---|---|
| NO | 180 to 220 ppm |
| $SO_2$ | 450 to 550 ppm |
| $NH_3$ | 240 to 260 ppm |
| $SO_3$ | 450 to 550 ppm |
| $O_2$ | 3% |
| $CO_2$ | 12.5% |
| Steam | 15% |
| $N_2$ | balance |

A durability test was conducted using the above gas, and the results are shown in the following Table I-5.

Table I-5

| Run No. | 1 | 2 | 3 | 4 | 5 |
|---|---|---|---|---|---|
| Catalysts of Examples | I-1 | I-4 | I-5 | I-6 | I-7 |
| Reaction time (hr) | $NO_x$ reduction rate (%) | | | | |
| Initial | 96.7 | 96.0 | 97.2 | 95.6 | 90.4 |
| 50 | 95.5 | 95.7 | 96.4 | 94.2 | 89.5 |
| 100 | 95.9 | 96.0 | 97.2 | 94.3 | 89.6 |
| 150 | 94.2 | 96.5 | 96.6 | 93.9 | 90.2 |
| 200 | 94.8 | 95.2 | 97.0 | 94.8 | 88.3 |
| 250 | 94.0 | 95.5 | 95.5 | 94.6 | 87.7 |
| 300 | 94.2 | 95.4 | 96.7 | 94.5 | 85.9 |

EXAMPLE I-10

This Example illustrates a catalyst life test on catalysts which was carried out for long periods of time using an exhaust gas from a fuel oil boiler as a gas to be treated. The reactor used had a diameter of 150 mm, and about 5 liters of each catalyst was used. The catalyst used were prepared in the same way as in Examples I-1 and I-6 and molded into pellets each having a diameter of 6 mm and a thickness of 6 mm. Ammonia was added to the exhaust gas from the fuel oil boiler having the following composition.

| $NO_x$ | 150 to 210 ppm |
|---|---|
| $NH_3$ | 160 to 260 ppm |
| $SO_2$ | 1000 to 1300 ppm |
| $SO_3$ | 30 to 70 ppm |
| $H_2O$ | 8 to 11 % |
| $O_2$ | 3 to 6 % |
| $CO_2$ | 11 to 14 % |
| Amount of soot | 60 to 90 mg/$Nm^3$ |
| $N_2$ | balance |

This gas was passed at a space velocity of 10,000 $hr^{-1}$ continuously for 2,000 hours. The results obtained are shown in Table I-6.

Table I-6

| Run No. Catalyst | 1 Example I-1 | 2 Example I-7 |
|---|---|---|
| Reaction time (hours) | $NO_x$ reduction rate (%) | |
| Initial stage | ca. 100 | ca. 100 |
| 250 | ca. 100 | ca. 100 |
| 500 | 99.5 | 99.3 |
| 1000 | 95.7 | 97.8 |
| 1250 | 96.2 | 95.0 |
| 1750 | 95.2 | 94.3 |
| 2000 | 95.0 | 94.8 |

II. Ti-W TYPE CATALYSTS

Example II-1

142.3 g of titanium tetrachloride (TiCl$_4$) was poured into 500 ml. of ice water, and the solution was neutralized with 3N ammonia water. The resulting precipitate was separated by filtration, and thoroughly washed with distilled water. A solution of 21.8 g of ammonium paratungstate [5(NH$_4$)$_2$O$_{12}$WO$_3$.5H$_2$O] in 530 ml. of distilled water was thoroughly mixed with the resulting cake. The resulting slurry was dried, and 1% by weight of polyethylene oxide (Alkox E-30, a product of Meisei Kagaku Kogyo K.K.) and about 25 ml. of distilled water were added, and they were milled in the wet state for 30 minutes and extruded into pellets having a diameter of 1.5 mm. The molded pellets were dried, and calcined at 500° C. for 5 hours in a muffle furnace. The resulting catalyst had an atomic ratio Ti:W of 9:1.

The reaction tube was made of quartz and had an inside diameter of 16.5 mm, and included therein a thermocouple protective quartz tube with an outside diameter of 5 mm. This reaction tube was heated in an electric furnace, and the temperature was measured by a thermocouple. A feed gas consisting of 700 to 900 ppm of NO, 850 to 1100 ppm of NH$_3$, 4% of O$_2$ and the balance being N$_2$ was passed at a space velocity of 58,000 to 60,000 hr$^{-1}$ at varying reaction temperatures. The NO$_x$ reduction rates obtained are shown in Table 1.

EXAMPLE II-2

Example II-1 was repeated in the same way as in Example II-1 except that the ratio of titanium to tungsten was changed. The results are shown in Table II-1.

Table II-1

| Run No. | | CT-II-6 | CT-II-7 | 1 | 2 | 3 | 4 |
|---|---|---|---|---|---|---|---|
| Reaction Temp. (° C) | Ti:W atomic ratio | 0:10 | 1:9 | 5:5 | 8:2 | 9.5:0.5 | 9.9:0.1 |
| | | NO$_x$ reduction rate (%) | | | | | |
| 250 | | 3.5 | 57.2 | 55.1 | 5.29 | 45.1 | 42.4 |
| 300 | | 10.0 | 66.6 | 69.6 | 82.0 | 78.3 | 69.6 |
| 350 | | 28.5 | 72.0 | 79.8 | 88.0 | 89.2 | 85.4 |
| 400 | | 40.5 | 72.2 | 81.6 | 89.5 | 90.7 | 90.5 |
| 450 | | 51.0 | 69.9 | 79.7 | 85.4 | 90.2 | 90.0 |
| 500 | | 57.0 | 67.0 | 73.1 | 78.7 | 89.1 | 88.3 |

Catalysts which exhibit especially high activities are those in which the titanium/tungsten atomic ratio (Ti/W) is 9.5:0.5 to 8:2. But this range of composition is not altogether critical, and catalysts having a wider range of composition outside this range also exhibit fairly good performance by properly prescribing the reaction conditions.

EXAMPLE II-3

Example II-1 was repeated except that the calcining temperature for catalysts was changed. The results are shown in Table II-2.

Table II-2

| Run No. | 1 | 2 | 3 | 4 | 5 |
|---|---|---|---|---|---|
| Calcining temperature (° C) | 300 | 400 | 600 | 700 | 800 |
| Reaction temp. (° C) | NO$_x$ reduction rate (%) | | | | |
| 250 | 51.0 | 51.8 | 50.1 | 45.2 | 25.8 |
| 300 | 83.0 | 84.5 | 82.7 | 65.4 | 52.2 |
| 350 | 90.6 | 91.5 | 89.3 | 77.8 | 65.0 |
| 400 | 91.1 | 93.0 | 89.5 | 79.7 | 70.1 |
| 450 | 88.2 | 93.0 | 88.2 | 78.0 | 70.8 |
| 500 | 83.0 | 88.1 | 85.2 | 70.6 | 63.2 |

EXAMPLE II-4

A solution of 18.2 g of ammonium paratungstate in 400 ml. of distilled water was added to a slurry of metatitanic acid [TiO(OH)$_2$] (50 g as TiO$_2$), and while being mixed thoroughly, they were evaporated and dried. To the resulting powder were added 1% by weight of Alkox E 30 and about 25 ml. of distilled water. The mixture was milled in the wet state for 30 minutes, and then extruded into pellets with a diameter of 1.5 mm. The molded pellets were calcined in a muffle furnace at 500° C. for 5 hours. The catalyst so obtained had an atomic ratio Ti:W of 9:1. Using this catalyst, the same reaction as in Example II-1 was carried out, and the results are are shown in Table II-3.

EXAMPLE II-5

142.3 g of titanium tetrachloride (TiCl$_4$) was carefully dissolved in 500 ml. of ethanol, and the solution was adjusted to pH 7 with 3 N ammonia water to form a precipitate. The resulting precipitate was separated by filtration and washed. A solution of 21.8 g of ammonium paratungstate in 530 ml. of distilled water was added to the precipitate, and they were well mixed. The mixture was evaporated to dryness, and to the resulting powder were added 1% by weight of Alkox E-30 and about 25 ml. of distilled water, and the mixture was milled in the wet state for 30 minutes. The mixture was then extruded into pellets having a diameter of 1.5 mm. The molded product obtained was calcined in a muffle furnace at 500° C. for 5 hours. The resulting catalyst had an atomic ratio Ti:W of 9:1. Using this catalyst, the same reaction as in Example II-1 was carried out. The results are shown in Table II-3.

EXAMPLE II-6

A 20% by weight aqueous solution of titanium trichloride (a product of Wako Junyaku K.K.) in an amount of 1000 g was neutralized with concentrated ammonia water (15N) to form a precipitate. The resulting precipitate was separated by filtration, and washed to form 139 g of a cake. It was confirmed by an ignition loss method that this cake contained titanium in an amount corresponding to 0.551 mol. A solution of 16.0g of ammonium paratungstate in 390 ml. of distilled water was added to the cake. While being mixed thoroughly, they were evaporated to dryness. To the resulting powder were added 1% by weight of E-30 and about 30 ml. of distilled water, and the mixture was milled for 30 minutes in the wet state and extruded into pellets each having a diameter of 1.5 mm. The resulting pellets were calcined at 500° C. for 5 hours in a muffle furnace. The resulting catalyst had an atomic ratio Ti:W of 9:1. Using this catalyst, the same reaction as in Example II-1 was carried out. The results are shown in Table II-3.

EXAMPLE II-7

This Example illustrates the use of titanium oxide (TiO$_2$ of the anatase type) as a raw material for titanium.

250 g of hot conc. surfuric acid was added to 100 g of titanium oxide, and with stirring, they were heated at about 200° C. for 2 hours. The mixture was cooled, and neutralized with aqueous ammonia. It was fully washed and filtered. An aqueous solution containing 82 g of ammonium paratungstate [5(NH$_4$)$_2$O.12WO$_3$.5H$_2$O] was added to the precipitate, and while being thoroughly mixed, they were evaporated to dryness. The dried mixture was treated in the same way as in Example II-1 to prepare a catalyst. The resulting catalyst had a Ti:W atomic ratio of 8:2. Using this catalyst, the same reaction as in Example II-1 was carried out. The results are shown in Table II-3.

EXAMPLE II-8

163.4 g (32.0 g calculated as (TiO$_2$) of titanium hydroxide prepared by adding ammonia water to titanium tetrachloride was thoroughly mixed with 32 g of titanium oxide (anatase type TiO$_2$, a product of Ishihara Sangyo Co., Ltd.) in a mixer. A solution of 23.2 g of ammonium paratungstate in 500 ml. of pure water was added to the resulting paste, and they were concentrated while being mixed with stirring to form an extrudable paste. The paste was extruded into pellets having a diameter of 1.5 mm, dried, and calcined at 500° C. for 5 hours. Using the resulting catalyst, the same reaction as in Example II-1 was carried out. The results obtained are shown in Table II-3.

EXAMPLE II-9

This Example illustrates an alumina-supported catalyst.

100 g of titanium tetrachloride was dissolved in water, and 182 g of a powder of aluminum hydroxide was added. With stirring, 3N aqueous ammonia was gradually added to neutralize the solution and thereby to deposit titanic acid on the aluminum hydroxide. This product was sufficiently washed, and filtered. An aqueous solution containing 16 g of ammonium paratungstate [5(NH$_4$)$_2$O.12WO$_3$.5H$_2$O] was added to the filtrate and mixed thoroughly, followed by evaporation to dryness. The dried product was treated in the same way as in Example II-1 to prepare a catalyst. The resulting catalyst had an atomic ratio Ti:W of 9:1, and the content of titanium oxide was 25% by weight based on the total weight of the catalyst.

The same reaction as in Example II-1 was carried out using this catalyst. The results are shown in Table II-3.

Table II-3

| Example No. | II-4 | II-5 | II-6 | II-7 | II-8 | II-9 |
|---|---|---|---|---|---|---|
| Reaction temperature (° C) | | | NO$_x$ reduction rate (%) | | | |
| 250 | 53.6 | 59.0 | 50.2 | 51.1 | 47.9 | 45.2 |
| 300 | 90.6 | 88.0 | 85.4 | 85.1 | 82.3 | 76.1 |
| 350 | 94.2 | 92.6 | 92.2 | 92.8 | 90.9 | 88.2 |
| 400 | 94.6 | 92.0 | 93.2 | 92.7 | 92.0 | 88.8 |
| 450 | 93.9 | 88.4 | 92.9 | 91.4 | 91.8 | 87.9 |
| 500 | 88.4 | 68.6 | 89.8 | 90.0 | 89.9 | 81.3 |

EXAMPLE II-10

142.3 g of titanium tetrachloride (TiCl$_4$) was poured in 500 ml. of ice water, and 3N aqueous ammonia was added to neutralize the solution. The resulting precipitate was dehydrated by centrifugal separation using a 300-mesh filter cloth, and then thoroughly washed with distilled water. The resulting cake was well admixed with a solution of 21.8 g of ammonium paratungstate [5(NH$_4$)$_2$O 12WO$_3$.5H$_2$O] in 530 ml, of water. The resulting slurry was dried, and on addition of a small amount of water, milled for 30 minutes in the wet state using a mixer and then extruded into pellets having a diameter of 6 mm. The resulting molded product was calcined at 600° C. for 5 hours in a muffle furnace. The catalyst so obtained had a metal atomic ratio Ti:W of 9:1. This catalyst was pulverized to a size of 10 to 20 mesh prior to use.

The reaction tube was a quartz reaction tube with an inside diameter of 16.5 mm which included a thermocouple protective tube made of quartz and having an outside diameter of 5 mm. The reaction tube was heated in an electric furnace, and the temperature was measured by a thermocouple. The feed gas had the following composition.

| | |
|---|---|
| NO | 700 ppm |
| NH$_3$ | 900 ppm |
| SO$_2$ | 500 ppm |
| O$_2$ | 4% |
| H$_2$O | 7.1% |
| N$_2$ | balance |

This gas was passed through the catalyst layer at a space velocity of 50,000 hr$^{-1}$ at varying reaction temperatures. The NO reduction rate was as shown in Table II-4.

Table II-4

| Reaction temperature (° C) | NO$_x$ reduction rate (%) |
|---|---|
| 250 | 60.1 |
| 300 | 92.3 |
| 350 | 96.5 |
| 400 | 96.7 |
| 450 | 95.3 |
| 500 | 91.7 |

EXAMPLE II-11

Using the catalyst of Example II-1, the relation between SV and NO conversion at a reaction temperature of 350° C. under specific conditions was examined. The same reaction as in Example II-1 was carried out except that the SV, that is, the flow rate of the feed gas, was changed. The results are shown in Table II-5.

Table II-5

| Space velocity (hr$^{-1}$) | NO reduction rate (%) |
|---|---|
| 10,000 | 99.2 |
| 30,000 | 96.2 |
| 50,000 | 92.2 |
| 100,000 | 76.2 |

These results demonstrate that the catalyst in accordance with the present invention exhibits sufficiently feasible activities even when the space velocity is set at 100,000 hr$^{-1}$.

EXAMPLE II-12

Using the same catalyst as used in Example II-1, a feed gas consisting of 570 ppm of NO, 940 ppm of NH$_3$, 530 ppm of SO$_2$, 590 ppm of SO$_3$, 10.3% of H$_2$O, 4% of O$_2$, and the balance being N$_2$ was reacted at a temperature of 350° C. and a space velocity (SV) of 11,800 hr$^{-1}$. The results are shown in Table II-6 below.

Table II-6

| Time that passed (hours) | NO reduction rate (%) |
| --- | --- |
| 45 | 98.6 |
| 90 | 97.3 |
| 150 | 98.1 |
| 240 | 98.3 |
| 285 | 97.6 |
| 325 | 98.0 |

The results shown in Table II-6 demonstrate that there is scarcely any reduction in the NO reduction rate although there is some dispersion in the measured values, and the catalyst in accordance with this invention retains a high activity over prolonged periods of time.

EXAMPLE II-13

10 Kg of titanium tetrachloride was dissolved in 12 liters of ice water, and 5% aqueous ammonia are added to the solution to neutralize it and to form a precipitate. 19.6 Kg of this precipitate (40 Kg calculated as $TiO_2$; $TiO_2$ content measured by the ignition loss method being 20.4% by weight) was mixed with stirring with a solution of 1.452 Kg of ammonium paratungstate in 20 liters of warm water using a kneader, and concurrently the mixture was concentrated. The resulting hydrogel was conditioned to a moisture content of 46% by peptizing it with oxalic acid at a pH of 3.5 and then adding 1.1% by weight of gelatin, and then extruded into pellets with a diameter of 6 mm. The resulting molded article was dried, and calcined at 550° C. for 5 hours. 5 liters of the resulting catalyst was packed in a reactor with an inside diameter of 150 mm. Ammonia was added to an exhaust gas from a fuel oil boiler to prepare a feed gas of the following composition.

| | |
| --- | --- |
| $NO_x$ | 110 to 300 ppm |
| $NH_3$ | 110 to 330 ppm ($HN_3/NO$ = 1.0 – 1.1 mol ratio) |
| $SO_2$ | 10 to 300 ppm |
| $SO_3$ | 1 to 15 ppm |
| $H_2O$ | 7 to 20% |
| $O_2$ | 3 to 10% |
| soot | about 20 mg/$Nm^3$ others such as $CO_2$ pr $N_2$ |

This gas was fed through the catalyst layer continuously for 5000 hours at a temperature of 380° C. and a space velocity of 10,000 $hr^{-1}$. The results obtained are shown in Table II-7.

Table II-7

| Time that passed (hours) | $NO_x$ reduction rate (%) |
| --- | --- |
| Initial stage | 95.0 |
| 200 | 97.2 |
| 500 | 97.5 |
| 1000 | 96.0 |
| 2000 | 99.1 |

Table II-7-continued

| Time that passed (hours) | $NO_x$ reduction rate (%) |
| --- | --- |
| 3000 | 98.2 |
| 4000 | 98.2 |
| 5000 | 99.0 |

EXAMPLE III-1

500 g of a titanium tetrachloride ($TiCl_4$) solution was dissolved in about 1 liter of water, and 81g of iron sulfate ($FeSO_4 \cdot 7H_2O$) was added to this solution. The resulting mixed solution was gradually added dropwise to ammonia water to form a co-precipitate of titanium and iron. At this time, ammonia water was added as required so that the pH of the ammonia solution did not decrease to below 7. The resulting co-precipitate was well washed with water by decantation, filtered, and dried at about 120° C. To the dried coprecipitate was added 3% by weight of graphite, and they were sufficiently kneaded. The kneaded mixture was molded into tablets each having a diameter of 6 mm and a thickness of 6 mm at a molding pressure of about 500 Kg/$cm^2$. The resulting molding tablets were calcined at 500° C. for 4 hours. The catalyst so obtained had a Ti:Fe atomic ratio of 9:1.

The catalyst (4 ml.) was packed in a quartz reaction tube with an inside diameter of 20 mm (the catalysts in the Examples were all adjusted to a particle size of 10 to 20 mesh), and a feed gas consisting of 190 to 210 ppm of NO, 450 to 550 ppm of $SO_2$, 240 to 260 ppm of $NH_3$, 2 to 4% of $O_2$, 12.5% of $CO_2$, 15% of steam and the balance being $N_2$ was passed through the catalyst layer at a space velocity of 10,000 $hr^{-1}$ to react it. The results are shown in Table II-1.

This catalyst had such a high activity that the $NO_x$ reduction ratio was more than 90% at a temperature within a broad range of 200° to 500° C.

EXAMPLE III-2

This Example illustrates the performance of a catalyst prepared at varying titanium/iron ratios.

Using catalysts prepared in the same way as in Example III-1 except that the titanium/iron ratio was changed, the same reaction as in Example III-1 was carried out except that the space velocity was changed to 50,000$hr^{-1}$. The results are shown in Table III-1.

Table III-1

| Run No. | CT III-1 | 1 | 2 | 3 | 4 | 5 | 6 | 7 |
| --- | --- | --- | --- | --- | --- | --- | --- | --- |
| Reaction temperature (° C) / Ti:Fe atomic ratio | 0:10 | 0.9:9.8 | 1:9 | 5:5 | 8:2 | 9:1 | 9.5:0.5 | 9.9:0.1 |
| | | | $NO_x$ reduction rate (%) | | | | | |
| 200 | 13 | 78 | 80 | 80 | 81 | 73 | 71 | 36 |
| 250 | 35 | 88 | 90 | 89 | 89 | 86 | 85 | 58 |
| 300 | 52 | 93 | 94 | 93 | 93 | 93 | 92 | 78 |
| 350 | 60 | 95 | 95 | 95 | 95 | 95 | 95 | 92 |
| 400 | 62 | 94 | 95 | 95 | 94 | 96 | 97 | 97 |
| 450 | 61 | 91 | 91 | 91 | 91 | 92 | 96 | 96 |
| 500 | 59 | 83 | 82 | 84 | 86 | 86 | 94 | 94 |

It can be seen from the above results that catalysts containing iron in an atomic percentage of 5 to 90% as against titanium exhibit high activites in a broad temperature range. Catalysts having a high iron content (that is, a Ti:Fe ratio of 1:9 and 0.2:9.8) also have high activities, and are advantageous from the viewpoint of the cost of production.

EXAMPLE III-3

Using a catalyst prepared in the same way as in Example III-1 except that the calcining temperature was changed, the same gas as used in Example III-1 was passed through the catalyst layer at a space velocity of 50,000 hr$^{-1}$. The results are shown in Table III-2.

Table III-2

| Run No. | | 1 | 2 | 3 | 4 |
|---|---|---|---|---|---|
| Reaction temperature (° C) | Calcining temperature (° C) | 400 | 600 | 700 | 800 |
| | | NO$_x$ reduction rate (%) | | | |
| 200 | | 74 | 71 | 59 | 28 |
| 250 | | 87 | 84 | 72 | 42 |
| 300 | | 94 | 92 | 81 | 55 |
| 350 | | 95 | 95 | 86 | 61 |
| 400 | | 94 | 96 | 89 | 61 |
| 450 | | 91 | 94 | 87 | 56 |
| 500 | | 86 | 88 | 78 | 45 |

EXAMPLE III-4

79.9 g (as TiO$_2$) of a slurry of metatitanic acid [TiO(OH)$_2$] was admixed thoroughly with 9.9g of hydrous iron oxide (α-FeOOH) and water to form a slurry which was then dried. To the resulting powder were added 1% by weight of polyethylene oxide (Alkox E-30) and about 20 ml. of water, and they were milled for 30 minutes in the wet state and then extruded into pellets having a diameter of 4 mm. The resulting molded pellets were calcined at 500° C. for 4 hours. The catalyst so obtained had a Ti:Fe atomic ratio of 9:1. Using this catalyst, a gas having the same composition as in Example III-1 was passed through the catalyst layer at a space velocity of 50,000 hr$^{-1}$. The results obtained are shown in Table II-3.

EXAMPLE III-5

This Example illustrates the use of titanium sulfate as a raw material for titanium.

350 g of titanium sulfate containing 24% by weight of Ti(SO$_4$)$_2$ was dissolved in 1 liter of distilled water, and 35.4 g of ferric nitrate [Fe(NO$_3$)$_3$.9H$_2$O] was dissolved in this solution. 3N ammonia water was added dropwise to the solution, and when the pH of the solution finally reached 8.0, the supply of ammonia water was stopped. The precipitate obtained was washed thoroughly with distilled water, and filtered repeatedly. The precipitate was dried at about 120° C. for 5 hours, and precalcined at 400° C. for 5 hours. The calcined product was thoroughly mixed with 2% by weight of graphite, and molded into tablets each having a diameter of 6 mm and a thickness of 6 mm. The resulting molded product was calcined at 500° C. for 4 hours. The resulting catalyst had a Ti:Fe atomic ratio of 8:2. Using this catalyst, a gas having the same composition as in Example II-1 was passed through the catalyst layer at a space velocity of 50,000 hr$^{-1}$ to react it. The results are shown in Table II-3.

EXAMPLE III-6

This Example illustrates the use of titanium oxide (TiO$_2$, anatase-type A 110, a product of Saikai Chemical Co., Ltd.) as a raw material for titanium.

250 g of conc. sulfuric acid was added to 100g of the titanium oxide, and the mixture was stirred. The resulting slurry was heated at about 200° C. for 2 hours. The resulting solution was well mixed with 38.7 g of ferric sulfate (FeSO$_4$.7H$_2$O). 3N ammonia water was added to the solution until the pH of the solution finally reached 8.0. The precipitate was thoroughly washed with distilled water and filtered repeatedly. The precipitate was treated in the same way as in Example III-5 to form a catalyst. The catalyst so prepared had a Ti:Fe atomic ratio of 9:1. Using this catalyst, a gas having the same composition as in Example III-1 was passed through the catalyst layer at a space velocity of 50,000 hr$^{-1}$. The results are shown in Table III-3. As is clear from the results shown in Table III-3, when titanium oxide treated with hot conc. sulfuric acid is used as a raw material for titanium, the resulting catalyst has the same activity as those of the catalysts in Examples III-1, III-4 and III-5.

EXAMPLE III-7

This Example illustrates a catalyst composed of titanium and iron supported on a carrier.

24 g of titanium tetrachloride (TiCl$_4$) was dissolved in 50 ml. of water, and the resulting solution was mixed with a solution of 5.7 g of ferric nitrate [Fe(NO$_3$)$_3$.9H$_2$O] in 20 ml. of water. 33.7 g of a silica alumina carrier (N-631, a product of Nikki Kagaku K.K.) was impregnated in the mixed solution, pre-calcined at 300° C., and then calcined at 500° C. for 4 hours. The resulting catalyst contained titanium and iron at a Ti:Fe atomic ratio of 9:1, and the amount of TiO$_2$ was 25% by weight based on the total weight of the catalyst. Using this catalyst, a gas having the same composition as in Example III-1 was passed through the catalyst layer at a space velocity of 50,000 hr$^{-1}$ to react it. The results are shown in Table III-3.

Table III-3

| Reaction temperature (° C) | Example No. | III-4 | III-5 | III-6 | III-7 |
|---|---|---|---|---|---|
| | | NO$_x$ reduction rate (%) | | | |
| 200 | | 79 | 78 | 77 | 72 |
| 250 | | 89 | 87 | 86 | 81 |
| 300 | | 95 | 93 | 93 | 86 |
| 350 | | 96 | 97 | 96 | 90 |
| 400 | | 97 | 98 | 97 | 92 |
| 450 | | 95 | 95 | 94 | 91 |
| 500 | | 91 | 88 | 92 | 86 |

EXAMPLE III-8

This Example illustrate the variations in NO$_x$ reduction rate versus varying space velocities.

Using the same catalyst as in Example III-1, the same feed gas as used in Example III-1 was reacted in the same way as in Example III-1 at a space velocity of 5000, 20,000, and 100,000 hr$^{-1}$ respectively. The results obtained are shown in Table III-4.

Table III-4

| Run No. | 1 | 2 | 3 |
|---|---|---|---|
| Space velocity (hr$^{-1}$) | 5000 | 20000 | 100000 |
| Reaction temperature (° C) | NO$_x$ reduction rate (%) | | |
| 200 | 93 | 85 | 46 |
| 250 | ca. 100 | 95 | 64 |
| 300 | ca. 100 | 99 | 75 |
| 350 | ca. 100 | ca. 100 | 80 |
| 400 | ca. 100 | ca. 100 | 83 |
| 450 | ca. 100 | 98 | 81 |
| 500 | 96 | 92 | 76 |

EXAMPLE III-9

This Example illustrates the durability of the catalyst of this invention to $SO_2$ and $SO_3$.

$SO_3$ used was obtained by heating and evaporating dilute sulfuric acid, and its amounts was adjusted to 10 to 100 times the amount of that contained in an exhaust gas from a boiler. Using each of the catalysts obtained in Examples III-1, III-4, III-5, III-6 and III-7, a feed gas of the following composition was reacted at a temperature of 350° C. and a space velocity of 50,000 hr$^{-1}$.

| | |
|---|---|
| NO | 190 to 210 ppm |
| $SO_2$ | 450 to 550 ppm |
| $NH_3$ | 240 to 260 ppm |
| $SO_3$ | 480 to 520 ppm |
| $O_2$ | 2 to 4% |
| $CO_2$ | 12.5% |
| Steam | 15% |
| $N_2$ | balance |

The results of a durability test using this gas are shown in Table III-5.

Table III-5

| Run No. | 1 | 2 | 3 | 4 | 5 |
|---|---|---|---|---|---|
| Catalyst | Example III-1 | Example III-4 | Example III-5 | Example III-6 | Example III-7 |
| Reaction time (hours) | $NO_x$ reduction rate (%) | | | | |
| Initial stage | 97 | 96 | 97 | 96 | 90 |
| 50 | 96 | 96 | 97 | 94 | 89 |
| 100 | 95 | 95 | 97 | 95 | 89 |
| 150 | 94 | 96 | 96 | 94 | 90 |
| 200 | 94 | 96 | 96 | 96 | 89 |
| 250 | 93 | 94 | 95 | 94 | 88 |
| 300 | 94 | 95 | 96 | 95 | 89 |

As is clear from Table III-5, the catalysts in accordance with this invention have superior durability to $SO_2$ and $SO_3$.

EXAMPLE III-10

This Example illustrates the results of a catalyst life test for prolonged periods of time using an exhaust gas from a fuel oil boiler as a gas to be treated. The reaction used had a diameter of 150 mm, and about 5 liters of each of catalysts prepared in the same way as in Examples III-1 and III-6 amd molded into pellets each having a diameter of 6 mm and a thickness of 6 mm. A feed gas was prepared by adding ammonia to an exhaust gas from a fuel oil boiler. The composition of the feed gas was as follows:

| | |
|---|---|
| $NO_x$ | 150 to 210 ppm |
| $NH_3$ | 160 to 260 ppm |
| $SO_2$ | 1000 to 1300 ppm |
| $SO_3$ | 30 to 70 ppm |
| $H_2O$ | 8 to 11% |
| $O_2$ | 3 to 6% |
| $CO_2$ | 11 to 14% |
| soot | 60 to 90 mg/Nm$^3$ |
| $N_2$ | balance |

This feed gas was passed through the catalyst layer continuously for 2000 hours at a space velocity of 10000 hr$^{-1}$. The results obtained are shown in Table III-6.

Table III-6

| Catalyst | Example II-1 | Example III-6 |
|---|---|---|
| Reaction time (hours) | $NO_x$ reduction rate (%) | |
| Initial stage | ca. 100 | ca. 100 |
| 250 | ca. 100 | ca. 100 |
| 500 | 99 | 99 |
| 750 | 98 | 98 |
| 1000 | 97 | 96 |
| 1250 | 96 | 94 |
| 1500 | 96 | 95 |
| 1750 | 95 | 94 |
| 2000 | 96 | 95 |

It is seen from Table III-6 that the catalysts in accordance with this invention exhibit very good durability to $SO_2$ and $SO_3$.

CT III-2

284 g of tetraisopropyl titanate $[Ti[OCH(CH_3)_2]_4]$ was placed in an evaporating plate, and allowed to stand in the atmosphere for about 30 hours, then dried at about 120° C. for 8 hours, and calcined at 500° C. for 8 hours. The resulting calcined product was thoroughly mixed with an aqueous solution containing 44.5 g of ferric nitrate $[Fe(NO_3)_3.9H_2O]$. The mixture was dried at about 120° C. for 3 hours, and then calcined at 500° C. for 1 hour. The calcined product was thoroughly mixed with 3% by weight of graphite, and molded into tablets each having a diameter of 6 mm and a thickness of 6 mm at a molding pressure of about 500 Kg/cm$^2$. The resulting molded tablets were calcined at 500° C. for 3 hours. The catalyst so prepared had a Ti:Fe atomic ratio of 9:1. Using this catalyst, the same reaction as in Example III-1 was performed. The results obtained are shown in Table III-7.

Table III-7

| Reaction temperature (° C) | 300 | 350 | 400 | 450 |
|---|---|---|---|---|
| $NO_x$ reduction rate (%) | 15.0 | 48.8 | 76.1 | 82.8 |

The low catalytic activity of the control catalyst prepared above was due to the fact that titanium oxide and iron oxide separate into two separate phases, and an intimate mixture of the oxides was not formed as in the catalyst of this invention shown in Example III-1.

IV. Ti-V TYPE CATALYSTS

EXAMPLE IV-1

189.7 g of titanium tetrachloride ($TiCl_4$) was poured in 1000 ml. of the ice water, and the solution was neutralized with 3N ammonia water. The resulting precipitate was separated by filtration, and thoroughly washed with distilled water. 189 g of the resulting cake (26.6 g as $TiO_2$, corresponding to ⅓ mol) was sufficiently kneaded with a solution of 2.05 g of ammonium metavanadate in 200 ml. of water, and then, the mixture was evaporated. The resulting cake was dried, and then, together with about 25 ml. of distilled water, milled in the wet state for 30 minutes in a mixer. Then, the mixture was extruded into pellets each having a diameter of 6 mm. The molded product was dried, and calcined at 500° C. for 5 hours in a muffle furnace. The catalyst so obtained had a Ti:V atomic ratio of 9.5:0.5. It was pulverized to a size of 10 to 20 mesh prior to use.

The reaction tube used was a quartz reaction tube with an inside diameter of 16.5 mm containing a quartz tube with an outside diameter of 5mm including a thermocouple therein, and the outside part of the reaction tube was heated in an electric furnace. A feed gas of the following composition was passed through the catalyst layer at a space velocity of 50000 hr$^{-1}$ at varying reaction temperatures. The NO$_x$ reduction rates obtained are shown in Table 1.

| | |
|---|---|
| NO | 700 ppm |
| NH$_3$ | 700 to 800 ppm |
| SO$_2$ | 482 ppm |
| O$_2$ | 4% |
| H$_2$O | 7.14% |
| N$_2$ | balance |

EXAMPLE IV-2

Using a catalyst prepared in the same way as in Example IV-1 except that the atomic ratio of titanium and vanadium was changed, the same reaction as in Example IV-1 was carried out. The results are shown in Table IV-1.

For comparison, a catalyst consisting of vanadium alone was prepared as follows:

58.5 g of ammonium metavanadate was decomposed at 330° C. for 1 hour in a muffle furnace. To the resulting powder were added 1% by weight of polyethylene oxide (Alkox E-30, a product of Meisei Kagaku Kogyo K.K.) and a small amount of distilled water. They were milled in the wet state, and extruded into pellets each having a diameter of 6 mm. The resulting molded product was calcined at 500° C. for 5 hours in a muffle furnace. The resulting catalyst was pulverized to a size of 10 to 20 mesh, and used in the same reaction as in Example IV-1. The results obtained are shown in Table IV-1 under CT-IV-2.

Table IV-1

| Run No. | | 1 | 2 | 3 | 4 | 5 | 6 | CT-IV-2 |
|---|---|---|---|---|---|---|---|---|
| Reaction temperature (° C.) | Ti : V atomic ratio | 9.9:0.1 | 9.7:0.3 | 9:1 | 8.5:1.5 | 7:3 | 5:5 | 0:10 |
| | | NO$_x$ reduction rate (%) | | | | | | |
| 200 | | 6.4 | 76.4 | 90.7 | 89.9 | 46.4 | 26.4 | 4.1 |
| 250 | | 10.9 | 94.9 | 96.9 | 96.3 | 80.3 | 60.7 | 19.6 |
| 300 | | 35.7 | 99.7 | ca. 100 | 99.7 | 98.0 | 97.3 | 32.7 |
| 350 | | 84.5 | 99.7 | ca. 100 | 99.8 | 99.7 | 99.7 | 77.7 |
| 400 | | 99.6 | 99.7 | 99.3 | 99.0 | 98.7 | 98.7 | 73.3 |
| 450 | | 98.2 | 97.7 | 88.1 | 83.3 | 47.3 | 42.7 | 41.0 |
| 500 | | 89.2 | 89.0 | — | — | — | — | — |

EXAMPLE IV-3

The same procedure as in Example V-1 was repeated except that the temperature for calcining the catalyst was changed as shown in Table IV-2. The feed gas used consisted of 600 ppm of NO, 600 ppm of NH$_3$, 500 ppm of SO$_2$, 550 ppm of SO$_3$, 4% of O$_2$ and 10% of H$_2$O. The space velocity was 50000 hr$^{-1}$. SO$_3$ was prepared by air oxidation of SO$_2$ using a catalyst (V$_2$O$_5$-diatomaceous earth; 10 to 20 mesh trade name N-801 a product of Nikki Kagaku K.K.) at a space velocity of 2300 hr$^{-1}$ and a reaction temperature of 300° C. The results obtained are shown in Table IV-2.

Table IV-2

| Run No. | 1 | 2 | 3 | 4 | 5 | 6 |
|---|---|---|---|---|---|---|
| Calcining temperature (° C) | 400 | 450 | 500 | 550 | 600 | 700 |
| Reaction temperature (° C) | NO$_x$ reduction rate (%) | | | | | |
| 200 | 70.0 | 85.5 | 87.0 | 90.0 | 0 | 0 |
| 250 | 94.0 | 97.6 | 95.0 | 95.6 | 17.0 | 0 |
| 300 | ca. 100 | ca. 100 | ca. 100 | ca. 100 | 72.6 | 20.0 |

Table IV-2-continued

| Run No. | 1 | 2 | 3 | 4 | 5 | 6 |
|---|---|---|---|---|---|---|
| Calcining temperature (° C) | 400 | 450 | 500 | 550 | 600 | 700 |
| Reaction temperature (° C) | NO$_x$ reduction rate (%) | | | | | |
| 350 | ca. 100 | ca. 100 | ca. 100 | ca. 100 | 95.7 | 70.5 |
| 400 | ca. 100 | ca. 100 | ca. 100 | ca. 100 | 88.2 | 83.5 |
| 450 | 98.5 | 98.5 | 98.0 | 98.5 | 36.4 | 46.0 |
| 500 | 86.0 | 80.0 | 85.0 | 73.0 | — | — |

EXAMPLE IV-4

This Example illustrates the use of metatitanic acid as a raw material for titanium oxide.

100 g of a slurry of metatitanic acid containing about 60% of water and 3.1 g of ammonium metavnanadate were well mixed with 100 ml. of water. The resulting slurry was dried at 150° C., and mixed with about 1 g of graphite. The mixture was molded into cylindrical tablets each having a diameter of 6 mm and a height of 6 mm. The molded tablets were calcined at 500° C. for 2 hours, and pulverized to a size of 10 to 20 mesh. This catalyst had a titanium: vanadium atomic ratio of 9.5:0.5. A feed gas consisting of 300 ppm of NO, 300 ppm of NH$_3$, 500 ppm of SO$_2$, 12% of CO$_2$, 3% of O$_2$, 15% of H$_2$O, and the balance being N$_2$ was passed through the catalyst layer at a space velocity of 59000 hr$^{-1}$ at varying reaction temperatures. The results are shown in Table IV-3.

Table IV-3

| Reaction temperature (° C) | NO$_x$ reduction rate (%) |
|---|---|
| 200 | 83 |
| 250 | 93 |
| 300 | ca. 100 |
| 350 | ca. 100 |
| 400 | ca. 100 |

EXAMPLE IV-5

This Example illustrates the use of vanadyl sulfate (VOSO$_4$.6H$_2$O) as a material for vanadium.

3N ammonia water was added to a solution of 189.7 g of titanium tetrachloride in 1000 ml. of ice water. The resulting precipitate was separated by filtration, and washed thoroughly with distilled water. 183 g (26.6 g as TiO$_2$ corresponding to ⅓ mol) of the resulting cake was sufficiently kneaded with a solution of 9.45 g of vanadyl sulfate in 100 ml. of water, and concurrently, moisture was evaporated off. The cake obtained was dried, and after adding about 25 ml. of distilled water, was milled for 30 minutes in the wet state, followed by extrusion into pellets having a diameter of 6 mm. The resulting molded product was dried, and then calcined at 400° C. for 5 hours in a muffle furnace. The resulting catalyst had a Ti:V atomic ratio of 9:1. Since vanadyl sulfate has a heat decomposition temperature in air of at least 400° C., the catalyst contained a sulfuric acid radical. The catalyst was pulverized to a size of 10 to 20 mesh. Using this catalyst, the same reaction as in Example IV-1 was carried out at varying reaction temperatures. The results obtained are shown in Table IV-4.

Table IV-4

| Reaction temperature (° C) | $NO_x$ reduction rate (%) |
|---|---|
| 200 | 82.1 |
| 250 | 95.0 |
| 300 | 99.6 |
| 350 | ca. 100 |
| 400 | ca. 100 |
| 450 | 97.6 |
| 500 | 80.0 |

EXAMPLE IV-6

This Example illustrates a lifetime test for prolonged time using an exhaust gas from a fuel oil boiler as a gas to be treated.

The reaction tube used had a diameter of 150 mm, and about 5 liters of a catalyst was packed in it. The catalyst was prepared in the same way as in Example IV-1 and molded into pellets having a diameter of 6 mm and a length of 6 mm. Ammonia was added to an exhaust gas from a heavy oil boiler to form a feed gas having the following composition.

| | |
|---|---|
| $NO_x$ | 150 ppm |
| $NH_3$ | 160 to 220 ppm |
| $SO_2$ | 1000 to 1300 ppm |
| $SO_3$ | 30 to 70 ppm |
| $H_2O$ | 8 to 11% |
| $O_2$ | 3 to 6% |
| $CO_2$ | 11 to 14% |
| soot | 60 to 90 mg/$Nm^3$ |
| $N_2$ | balance |

The feed gas was passed through the catalyst layer continuously for 2000 hours at a reaction temperature of 300° C. and a space velocity of 10000 $hr^{-1}$. The results obtained are shown in Table IV-5.

Table IV-5

| Reaction time (hours) | $NO_x$ reduction rate (%) |
|---|---|
| 6 | ca. 100 |
| 250 | 99.7 |
| 500 | 98.5 |
| 1000 | 97.7 |
| 1250 | 96.8 |
| 1500 | 96.5 |
| 1750 | 96.7 |
| 2000 | 96.8 |

V. Ti-Ni TYPE CATALYSTS

EXAMPLE V-1

95 g of titanium tetrachloride ($TiCl_4$) was distilled in about 1000 ml. of distilled water, and 5N ammonia water was added to the solution until the pH of the solution reached 7.5. The resulting precipitate was thoroughly kneaded with an aqueous solution containing 36.4 g of nickel nitrate [$Ni(NO_3)_2 \cdot 6H_2O$]. The mixture was thoroughly kneaded with 3% by weight of graphite, and molded into tablets having a diameter of 6 mm at a molding pressure of 3.5 tons. The molded tablets were calcined at 500° C. for 5 hours. The catalyst so obtained had a Ti:Ni atomic ratio of 8:2. The catalyst was pulverized to a size of 10 to 20 mesh, and packed in an amount of 4 ml. into a quartz reaction tube with an inside diameter of 17 mm.

A feed gas consisting of 190 to 210 ppm of NO, 240 to 260 ppm of $NH_3$, 450 to 550 ppm of $SO_2$, 2 to 4% of $O_2$, 12.5% of $CO_2$, 15% of steam and the balance being $N_2$ was passed through the catalyst layer at a space velocity of 11800 $hr^{-1}$, and the relation between the reaction temperature and the $NO_x$ reduction rate was determined. The results are shown in Table 1.

EXAMPLE V-2

Catalysts were prepared in the same way as in Example V-1 except that the ratio of titanium to nickel was changed. The resulting catalysts had a Ti:Ni atomic ratio of 0:10, 1:9, 5:5, 8:2, 9:1, 9.5:0.5, and 10:0. Using these catalysts, a feed gas having the same composition as in Example V-1 was reacted at a space velocity of 59000 $hr^{-1}$ and a reaction temperature of 350° C. The results are shown in Table V-1.

Table V-1

| Run No. | Ti:Ni atomic ratio | $NO_x$ reduction rate (%) |
|---|---|---|
| CT V-1 | 0:10 | 33.5 |
| 1 | 1:9 | 40.0 |
| 2 | 5:5 | 60.0 |
| 3 | 8:2 | 89.0 |
| 4 | 9:1 | 85.5 |
| 5 | 9.5:0.5 | 77.0 |

Examples V-3 to V-7 relate to raw materials for catalysts.

EXAMPLE V-3

A slurry of metatitanic acid [$TiO(OH)_2$] (40 g as $TiO_2$) was thoroughly mixed with a solution of 16.2 g of nickel nitrate [$Ni(NO_3)_2 \cdot 6H_2O$] in about 40 ml. of distilled water, and the mixture was treated in the same way as in Example V-1 to prepare a catalyst. The resulting catalyst had a Ti:Ni atomic ratio of 9:1. Using this catalyst, the same feed gas as in Example V-1 was reacted under the same conditions, and using the same apparatus, as in Example V-2. The results obtained are shown in Table V-2.

EXAMPLE V-4

95 g of titanium tetrachloride ($TiCl_4$) was carefully dissolved in 500 ml. of ethanol, and the solution was neutralized by adding 3N ammonia water. The resulting precipitate was thoroughly washed and filtered. The precipitate was then fully kneaded with an aqueous solution containing 16.2 g of nickel nitrate [$Ni(NO_3)_2 \cdot 6H_2O$]. The kneaded mixture was treated in the same way as in Example V-1 to prepare a catalyst having a Ti:Ni atomic ratio of 9:1. Using this catalyst, the same reaction as in Example V-2 was carried out. The results are shown in Table V-2.

EXAMPLE V-5

386 g of an aqueous solution of titanium trichloride (containing 20% by weight of $TiCl_3$) was neutralized with 3N ammonia water to form a precipitate. The precipitate was thoroughly washed, and filtered, and then well kneaded with an aqueous solution containing 16.2 g of nickel nitrate [$Ni(NO_3)_2 \cdot 6H_2O$]. The kneaded mixture was treated in the same way as in Example V-1 to prepare a catalyst having a Ti:Ni atomic ratio of 9:1. Using this catalyst, the same reaction as in Example V-2 was carried out. The results obtained are shown in Table V-2.

EXAMPLE V-6

400 g of a titanium sulfate solution (containing 24% by weight of $Ti(SO_4)_2$) was diluted with distilled water to adjust the total amount of the solution to 1 liter. This solution was added dropwise to 8N ammonia water to form a precipitate. The precipitate was thoroughly washed, filtered, and then dried at about 120° C. for 5 hours. The dried precipitate was thoroughly kneaded with an aqueous solution containing 8.1 g of nickel nitrate [$Ni(NO_3)_2.6H_2$)], and the mixture was treated in the same way as in Example V-1 to prepare a catalyst having a Ti:Ni atomic ratio of 9:1. Using this catalyst, the same reaction as in Example V-2 was carried out. The results are shown in Table V-2.

EXAMPLE V-7

150 g of conc. sulfuric acid was added to 40% of titanium oxide ($TiO_2$, anatase type), and they were stirred. The resulting slurry was heat-treated at about 200° C. for 2 hours. The slurry was cooled, neutralized with 5N ammonia water thoroughly washed, and filtered. The resulting precipitate was thoroughly kneaded with an aqueous solution containing 16.2 g of nickel nitrate [$Ni(NO_3)_2.6H_2O$]. The mixture was treated in the same way as in Example V-1 to form a catalyst having a Ti:Ni atomic ratio of 9:1. Using this catalyst, the same reaction as in Example V-2 was carried out. The results are shown in Table V-2.

CT V-1

40 g of titanium oxide ($TiO_2$, anatase-type) was thoroughly kneaded with an aqueous solution containing 16.2 g of nickel nitrate ([$Ni(NO_3)_2.6H_2O$], and the mixture was treated in the same way as in Example V-1 to form a catalyst having a Ti:Ni atomic ratio of 9:1. Using this catalyst, the same reaction as in Example V-2 was carried out. The results are shown in Table V-2.

Table V-2

| Example No. | V-3 | V-4 | V-5 | V-6 | V-7 | CT V-1 |
|---|---|---|---|---|---|---|
| Reaction temperature (° C) / Raw material for titanium | $TiO(OH)_2$ | $TiCl_4$ | $TiCl_3$ | $Ti(SO_4)_2$ | $TiO_2$ treated with $H_2SO_4$ | $TiO_3$ |
| | | | $NO_x$ reduction rate (%) | | | |
| 200 | 76 | 73 | 74 | 73 | 72 | 3 |
| 250 | 87 | 81 | 84 | 83 | 84 | 16 |
| 300 | 91 | 87 | 89 | 90 | 89 | 32 |
| 350 | 93 | 91 | 92 | 92 | 91 | 46 |
| 400 | 94 | 91 | 93 | 94 | 90 | 54 |
| 450 | 91 | 88 | 91 | 92 | 87 | 58 |

It is clear from the results shown in Table V-2 that titanium oxide treated with hot conc. sulfuric acid exhibits an equivalent catalytic activity to those of catalysts prepared from other titanium materials widely used for catalyst preparation (Example V-7), and that when titanium oxide was used as a material as such (CT V-1), it merely acts as a carrier.

EXAMPLE V-8

This Example illustrates a catalyst life test in $NO_x$ catalytic reduction using ammonia using the same catalyst as in Example V-3, and the effect of the coexisting sulfur oxides on the catalyst was examined.

A feed gas having the following composition was passed through the catalyst layer at a space velocity of 11800 hr$^{-1}$ and a reaction temperature of 350° C.

| | |
|---|---|
| NO | 190 to 210 ppm |
| $NH_3$ | 240 to 260 ppm |
| $SO_2$ | 450 to 550 ppm |
| $SO_3$ | 480 to 520 ppm |
| $O_2$ | 2 to 4% |
| $CO_2$ | 12.5% |
| steam | 10% |
| $N_2$ | balance |

The results are shown in Table V-3.

Table V-3

| Time that passed (hours) | $NO_x$ reduction rate (%) |
|---|---|
| Initial stage | 97.5 |
| 6 | 94.0 |
| 12.5 | 92.0 |
| 25 | 93.5 |
| 50 | 93.1 |
| 100 | 94.0 |
| 150 | 93.5 |
| 200 | 93.8 |
| 250 | 93.0 |
| 300 | 94.0 |

In spite of the fact that the reaction conditions were severe with the inclusion of high concentration $SO_3$ in the feed gas, the catalyst of this invention exhibited scarcely any reduction in activity although some reduction was seen at the initial stage of the reaction. Even after a lapse of 300 hours, the catalyst should give an $NO_x$ reduction rate of about 93%.

VI. Ti-CO TYPE CATALYSTS

EXAMPLE VI-1

95 g of titanium tetrachloride ($TiCl_4$) was dissolved in about 1000 ml. of distilled water, and 5N ammonia water was added to the solution until the pH of the solution reached 7.5. The resulting precipitate was thoroughly washed, filtered, and fully kneaded with an aqueous solution containing 36.4 g of cobalt nitrate [$Co(NO_3)_2.6H_2O$]. The mixture was then treated in the same way as in Example V-1 to prepare a catalyst having a Ti:Co atomic ratio of 8:2.

The catalyst obtained was pulverized to a size of 10 to 20 mesh, and used in the reaction under the same conditions as in Example V-1 using the same apparatus. The results are shown in Table 1.

EXAMPLE VI-2

A catalyst having a Ti:Co:Ni atomic ratio of 8:1:1 was prepared using the raw materials used in Examples V-1 and VI-1 by the same procedure as in Example V-1.

The catalyst obtained was pulverized to a size of 10 to 20 mesh, and used in the reaction under the same conditions using the same apparatus as in Example V-1.

Table VI-1

| Reaction temperature (°C) | $NO_x$ reduction rate (%) |
|---|---|
| 200 | 80 |
| 250 | 90 |
| 300 | 97 |
| 350 | 97 |
| 400 | 96 |
| 450 | 92 |

EXAMPLE VI-3

Catalysts were prepared in the same way as in Example VI-1 except that the titanium/cobalt atomic ratio was varied. The resulting catalysts had a Ti:Co atomic ratio of 0:10, 1:9, 5:5, 8:2, 9:1, 9.5:0.3, and 10:0.

Using each of these catalyst, the same feed gas as used in Example V-1 was reacted at a space velocity of 59000 $hr^{-1}$ and a reaction temperature of 350° C. in the same apparatus as used in Example V-1. The results are shown in Table VI-2.

Table VI-2

| Run No. | Ti:Co atomic ratio | $NO_x$ reduction rate (%) |
|---|---|---|
| CT VI-1 | 0:10 | 40.0 |
| 1 | 1:9 | 43 |
| 2 | 5:5 | 66.0 |
| 3 | 8:2 | 91.5 |
| 4 | 9:1 | 84.0 |
| 5 | 9.5:0.5 | 79.4 |

VII. Ti-Cu TYPE CATALYSTS

EXAMPLE VII-1

A catalyst in accordance with this invention was prepared as follows:

95 g of titanium tetrachloride ($TiCl_4$) was dissolved in 1000 ml. of distilled water, and the solution was neutralized with 5N ammonia water to adjust its pH to 7.5. The resulting precipitate was thoroughly washed, and filtered. An aqueous solution containing 30.2 g of copper nitrate [$Cu(NO_3)_2 \cdot 3H_2O$] was added to the precipitate, and they were well kneaded. The resulting mixture was dried at about 120° C. for 5 hours, and precalcined at 400° C. for 3 hours. The pre-calcined product was treated in the same way as in Example V-1 to prepare a catalyst having a Ti:Cu atomic ratio of 8:2.

Using this catalyst, its $NO_x$ reduction rate was measured under the same conditions as in Examples V-1 and VI-1. The results are shown in Table 1.

EXAMPLE VII-2

Catalysts were prepared by the same procedure as in Example VII-1 except that the titanium/copper atomic ratio was changed. The resulting catalysts had a Ti:Cu atomic ratio of 0:10, 1:9, 5:5, 8:2, 9:2 and 9.5:0.5.

Using these catalysts, the same reaction as in Example V-2 was performed. The results are shown in Table VII-1.

Table VII-1

| Run No. | Ti:Cu atomic ratio | $NO_x$ reduction rate (%) |
|---|---|---|
| CT VII-1 | 0:10 | 53.5 |
| 1 | 1:9 | 60.0 |

Table VII-1-continued

| Run No. | Ti:Cu atomic ratio | $NO_x$ reduction rate (%) |
|---|---|---|
| 2 | 5:5 | 73.5 |
| 3 | 8:2 | 93.0 |
| 4 | 9:1 | 90.5 |
| 5 | 9.5:0.5 | 82.5 |

EXAMPLE VII-3

Catalysts were prepared in the same way as in Example VII-1 except that the catalyst calcining temperature was changed. Using each of these catalysts, the same feed gas as in Example VII- was reacted at a space velocity of 59000 $hr^{-1}$. The results are shown in Table VII-2. In Run No. 1, the pre-calcining temperature was 300° C.

Table VII-2

| Run No. | 1 | 2 | 3 | 4 | 5 | 6 |
|---|---|---|---|---|---|---|
| Calcining temperature (°C) | 300 | 400 | 500 | 600 | 700 | 800 |
| Reaction temperature (°C) | $NO_x$ reduction rate (%) | | | | | |
| 200 | 50 | 75 | 79 | 70 | 64 | 26 |
| 250 | 62 | 85 | 86 | 82 | 74 | 40 |
| 300 | 73 | 91 | 91 | 91 | 84 | 51 |
| 350 | 74 | 93 | 92 | 93 | 88 | 58 |
| 400 | 67 | 91 | 91 | 93 | 88 | 54 |
| 450 | 57 | 83 | 88 | 87 | 82 | 43 |

EXAMPLE VII-4

This Example illustrates a carrier-supported catalyst.

47.5 g of titanium tetrachloride was dissolved in water, and 33.3 g of an aluminum hydroxide powder was added. With stirring, 3N ammonia water was gradually added to neutralize the solution and to deposit titanic acid on aluminum hydroxide. The resulting precipitate was thoroughly washed, filtered, and then sufficiently kneaded with 6.3 g of copper formate [$Cu(HCOO)_2 \cdot 4H_2O$] in the wet state. The mixture was dried at 120° C. for 5 hours, and pre-calcined at 400° C. for 2 hours. The precalcined mixture was well mixed with 2% by weight of graphite, and after moisture adjustment, granulated. The granulated mixture was molded at a pressure of 3.5 tons into tablets each having a diameter of 6 mm and a thickness of 6 mm. The molded product was calcined at 600° C. for 4 hours. The resulting catalyst had a Ti:Cu atomic ratio of 9:1 and was supported on 60% by weight alumina.

Using this catalyst, the same reaction as in Example V-2 was carried out. The results are shown in Table VII-3.

Table VII-3

| Reaction temperature (°C) | $NO_x$ reduction rate (%) |
|---|---|
| 200 | 69 |
| 250 | 81 |
| 300 | 89 |
| 350 | 93 |
| 400 | 94 |
| 450 | 92 |

EXAMPLE VII-5

This Example illustrates the relation of the specific velocity to the $NO_x$ reduction rate at a reaction temperature using the catalyst shown in Example VII-1. The reaction conditions were the same as in Example VII-1 except that the space velocity, that is the flow rate of the feed gas, was changed. The results are shown in Table VII-4.

Table VII-4

| Flow rate of feed gas (/min.) | Space velocity (hr$^{-1}$) | NO$_x$ reduction rate (%) |
|---|---|---|
| 0.67 | 10000 | 100 |
| 2.0 | 30000 | 97 |
| 3.3 | 50000 | 93 |
| 6.7 | 100000 | 76 |

The results shown in Table VII-4 demonstrate that the catalyst of this invention exhibits superior NO$_x$ reducing activities at a space velocity of not more than 50000 hr$^{-1}$, and can be well used for practical purposes.

VIII. Ti-Cr TYPE CATALYSTS

EXAMPLE VIII-1

A catalyst in accordance with this invention was prepared as follows:

500 g of a solution of titanium tetrachloride (TiCl$_4$) was dissolved in about 1 liter of water. To this solution was added 116 g of chromium nitrate [Cr(NO$_3$)$_3$.9H$_2$O]. The mixture gradually added dropwise to ammonia water to form a coprecipitate of titanium and chromium. In this case, ammonia water was added as required so that the pH of the solution did not decrease below 8. The resulting coprecipitate was well washed with water, filtered, and dried at about 120° C. The dried coprecipitate was well kneaded with 3% by weight of graphite, and molded at a molding pressure of about 500 Kg/cm$^2$ into tablets each having a diameter of 6 mm and a thickness of 6 mm. The resulting molded product was calcined at 500° C. for 4 hours to form a catalyst having a Ti:Cr atomic ratio of 9:1.

4 ml. of the resulting catalyst was packed into a quartz reaction tube with an inside diameter of 20 mm (after adjusting the size of the catalyst to 10 to 20 mesh). Using this catalyst, a gas consisting of 290 to 310 ppm of NO, 450 to 550 ppm of SO$_2$, 290 to 310 ppm of NH$_3$, 2 to 4% of O$_2$, 10 to 13% of CO$_2$, 12 to 16% of steam, and the balance being N$_2$ was passed through the catalyst layer at a space velocity of 10000 hr$^{-1}$. The results are shown in Table 1.

As is shown in Table 1, the catalyst in accordance with this invention exhibits a high activity within a broad temperature range of 200° to 500° C. as shown by an NO$_x$ reduction rate of 90%.

EXAMPLE VIII-2

Using each of catalysts prepared in the same way as in Example VIII-1 except that the titanium:chromium atomic ratio was changed, the same feed gas as in Example VIII-1 was reacted at a space velocity of 59000 hr$^{-1}$. The results are shown in Table VIII-1.

Table VIII-1

| Run No. | 1 | 2 | 3 | 4 | 5 |
|---|---|---|---|---|---|
| Ti:Cr atomic ratio | 5:5 | 8:2 | 9:1 | 9.5:0.5 | 9.9:0.1 |
| Reaction temperature (° C) | | NO$_x$ reduction rate (%) | | | |
| 250 | 75 | 88 | 87 | 82 | 51 |
| 300 | 81 | 91 | 92 | 88 | 75 |
| 350 | 82 | 93 | 94 | 92 | 84 |
| 400 | 80 | 90 | 94 | 92 | 88 |
| 450 | 71 | 88 | 92 | 91 | 90 |
| 500 | 68 | 85 | 87 | 78 | 89 |

It can be seen from the results shown in Table VIII-1 that catalysts having a titanium/chromium atomic ratio of 1/0.01 – 1.0, preferably 1/0.05 – 0.25, exhibit good results.

EXAMPLE VIII-3

Using catalysts prepared in the same way as in Example VIII-1 except that the calcining temperature was changed, the same reaction as in Example VIII-2 was carried out. The results obtained are shown in Table VIII-2.

Table VIII-2

| Run No. | 1 | 2 | 3 | 4 | 5 |
|---|---|---|---|---|---|
| Calcining temperature (° C) | 300 | 400 | 500 | 600 | 700 |
| Reaction temperature (° C) | | NO$_x$ reduction rate (%) | | | |
| 250 | 70 | 84 | 87 | 60 | 34 |
| 300 | 81 | 90 | 92 | 75 | 48 |
| 350 | 88 | 93 | 94 | 84 | 61 |
| 400 | 89 | 93 | 94 | 89 | 70 |
| 450 | 87 | 92 | 92 | 90 | 74 |
| 500 | 84 | 87 | 88 | 86 | 73 |

EXAMPLES VIII-4 to VIII-7

Each of metatitanic acid [TiO(OH)$_2$], titanium sulfate [Ti(SO$_4$)$_2$] and titanium oxide treated with conc. sulfuric acid at 200° C. for 2 hours was kneaded with chromium nitrate [Cr(NO$_3$)$_3$] at a Ti:Cr atomic ratio of 9:1. The resulting mixture was dried at about 120° C. for about 5 hours. The mixture was granulated to a size of smaller than 10 mesh, and mixed with 2% by weight of graphite. Furthermore, water was added to adjust the moisture content of the mixture to 10% by weight. The mixture was then molded at a molding pressure of 500 Kg/cm$^2$ into tablets each having a diameter of 6 mm and a thickness of 6 mm. The molded product was calcined at 500° C. for 4 hours. Using the resulting catalyst, the same reaction as in Example VIII-2 was performed. The results are shown in Table VIII-3.

Table VIII-3

| Example No. | | VIII-4 | VIII-5 | VIII-6 | VIII-7 |
|---|---|---|---|---|---|
| Reaction tempera-ture (° C) | Ratio material for Ti | TiCl$_4$ | TiO(OH)$_2$ | Ti(SO$_4$)$_2$ | TiO$_2$ |
| | | NO$_x$ reduction rate (%) | | | |
| 250 | | 87 | 85 | 78 | 68 |
| 300 | | 92 | 92 | 90 | 78 |
| 350 | | 94 | 96 | 93 | 91 |
| 400 | | 94 | 95 | 92 | 90 |
| 450 | | 92 | 91 | 90 | 84 |
| 500 | | 87 | 85 | 84 | 79 |

EXAMPLE VIII-8

This Example illustrates the preparation of alumina-supported catalysts.

Each of the catalysts was prepared so that the Ti:Cr atomic ratio was 9:1 by varying the content of the active catalyst ingredient.

An aqueous solution containing predetermined amounts of titanium tetrachloride and chromium nitrate was mixed with an aqueous solution containing a predetermined amount of aluminum nitrate, and 6N ammonia water was added with stirring to the mixed aqueous solution until the pH of the solution finally reached 8.0. The resulting precipitate was thoroughly washed with distilled water by distillation, and then separated by filtration. The resulting coprecipitate was dried at about 120° C. The dried coprecipitate was fully kneaded with 3% by weight of graphite, and the mixture was molded at a molding pressure of about 500 Kg/cm² into tablets each having a diameter of 6 mm and a thickness of 6 mm. The molded product was calcined at 500° C. for 4 hours.

The titanium content of these catalysts was adjusted so that the amount of $TiO_2$ was 5, 10, 30 and 70% by weight.

Using each of these catalysts, the same reaction as in Example VIII-1 was carried out. The results are shown in Table VIII-4.

Table VIII-4

| Run No. | 1 | 2 | 3 | 4 | 5 |
|---|---|---|---|---|---|
| Reaction temperature (° C) | \multicolumn{5}{c}{$TiO_2$ wt%} |
| | 2 | 5 | 10 | 30 | 70 |
| | \multicolumn{5}{c}{$NO_x$ reduction rate (%)} |
| 250 | 48 | 64 | 73 | 79 | 84 |
| 300 | 55 | 77 | 87 | 90 | 93 |
| 350 | 63 | 85 | 92 | 94 | 97 |
| 400 | 69 | 90 | 95 | 96 | 98 |
| 450 | 78 | 91 | 92 | 93 | 95 |
| 500 | 75 | 87 | 90 | 90 | 92 |

EXAMPLE VIII-9

This Example illustrate a life test of the catalyst of this invention for prolonged periods of time using an exhaust gas from a fuel oil boiler.

The catalyst (tablets 6 mm in diameter, 6 mm in thickness) of Example VIII-1 was packed in an amount of 5 liters in a reactor with an inside diameter of 150 mm. 160 to 250 ppm of $NH_3$ was added to an exhaust gas from a fuel oil boiler which consisted of 160 to 250 ppm of $NO_x$, 1000 to 1200 ppm of $SO_2$, 30 to 60 ppm of $SO_3$, 8 to 10% of steam, 3 to 5% of $O_2$, 11 to 14% of $CO_2$, and 60 to 90 mg/Nm³ of soot. The resulting feed gas was passed through the catalyst layer at a reaction temperature of 350° ± 10° C. at a space velocity of 10,000 hr$^{-1}$ to perform an $NO_x$ reducing reaction. The results obtained after the 1500 hours' continuous life test are shown in Table VIII-5.

Table VIII-5

| Time that passed (hours) | $NO_x$ reduction rate (%) |
|---|---|
| Initial stage | 99.2 |
| 100 | 98.5 |
| 200 | 98.0 |
| 400 | 98.0 |
| 800 | 98.2 |
| 1000 | 97.6 |
| 1200 | 97.0 |
| 1400 | 97.5 |
| 1500 | 97.0 |

As is clear from Table VIII-5, the catalyst in accordance with the method of this invention is not poisoned by sulfur oxides or other gases contained in the exhaust gas, and has good durability.

IX. Ti - U TYPE CATALYSTS

EXAMPLE IX-1

189.7 g of titanium tetrachloride ($TiCl_4$) was poured into 1000 ml. of ice water, and 3N ammonia water was added to neutralize the solution. The resulting precipitate was separated by filtration, and thoroughly washed with distilled water 182 g of the resulting cake (32.0 g as $TiO_2$, corresponding to 0.4 mol) was well kneaded with a solution of 22.3 g of uranyl nitrate [$UO_2(NO_3)_2 \cdot 6H_2O$] in 100 ml. of distilled water, and concurrently, the moisture was evaporated off. The resulting cake was dried, and then after adding about 30 ml. of distilled water, was milled in the wet state in a mixer. The mixture was then extruded into pellets having a diameter of 6 mm. The resulting product was dried, and then calcined at 500° C. for 5 hours in a muffle furnace. The catalyst obtained had a Ti:U atomic ratio of 9:1. The catalyst was pulverized to a size of 10 to 20 mesh prior to use.

The reactor was a quartz reaction tube with an inside diameter of 16.5 mm including a thermocouple protective tube made of quartz and having an outside diameter of 5 cm. The outside portion of the reactor was heated in an electric furnace. The feed gas had the following composition.

| | |
|---|---|
| NO | 700 ppm |
| $NH_3$ | 700 to 800 ppm |
| $SO_2$ | 450 ppm |
| $O_2$ | 4% |
| $H_2O$ | 6.4% |
| $N_2$ | balance |

This gas was passed through the catalyst layer at a space velocity of 30000 hr$^{-1}$ at varying reaction temperatures. The $NO_x$ reduction rates obtained are shown in Table 1.

EXAMPLE IX-2

Using catalysts prepared in the same way as in Example IX-1 except that the titanium:uranium atomic ratio was changed, the same reaction as in Example IX-1 was carried out. The results obtained are shown in Table IX-1.

CT IX-1

200.8 g of uranyl nitrate was dissolved in 300 ml. of distilled water, and 3N ammonia water was added to neutralize the solution. The resulting precipitate was separated by filtration, and washed with distilled water, followed by drying at 110° C. for 18 hours. A small amount of water was added to the resulting powder, and the powder was milled in the wet state by a mixer, and extruded into pellets with a diameter of 6 mm. The resulting molded product was dried, and calcined at 500° C. for 5 hours in a muffle furnace. The product was pulverized to a size of 10 to 20 mesh. Using this catalyst, the same reaction as in Example IX-1 was performed. The results are shown in Table IX-1.

Table IX-1

| Run No. | Atomic ratio of Ti:U | Reaction temperature (° C) | | | | | | | |
|---|---|---|---|---|---|---|---|---|---|
| | | 200 | 250 | 300 | 350 | 400 | 450 | 500 | 550 |
| | | \multicolumn{8}{c}{$NO_x$ reduction rate (%)} |
| 1 | 9.9:0.1 | 19.3 | 36.8 | 85.2 | 99.4 | 100 | 100 | 100 | 100 |
| 2 | 9.5:0.5 | 75.9 | 94.7 | 100 | 100 | 100 | 100 | 100 | 99.7 |
| 3 | 8:2 | 89.6 | 98.9 | 100 | 100 | 100 | 100 | 100 | 89.5 |
| 4 | 7:3 | 84.3 | 93.1 | 98.4 | 99.9 | 99.9 | 99.9 | 99.0 | 85.03 |
| 5 CT | 5:5 | 64.2 | 81.2 | 93.1 | 97.8 | 98.3 | 97.6 | 93.8 | 79.2 |

Table IX-1-continued

| Run No. | Atomic ratio of Ti:U | Reaction temperature (° C) |  |  |  |  |  |  |  |
|---|---|---|---|---|---|---|---|---|---|
|  |  | 200 | 250 | 300 | 350 | 400 | 450 | 500 | 550 |
|  |  | NO$_x$ reduction rate (%) |  |  |  |  |  |  |  |
| IX-1 | 0:10 | 28.4 | 67.9 | 26.0 | 99.4 | 99.9 | 99.6 | 97.2 | 73.4 |

CT IX-2

375.1 g of aluminum nitrate [Al(NO$_3$)$_3$.9H$_2$O] was dissolved in 400 ml. of distilled water, and 3N ammonia water was added to neutralize the solution. The resulting precipitate was separated by filtration, and washed thoroughly with distilled water. 124 g (20.4 g, corresponding to 0.2 mol. as Al$_2$O$_3$) of the resulting cake was admixed with a solution of 22.3 g of uranyl nitrate in 100 ml. of distilled water, and the mixture was treated in the same way as in Example IX-1 to form a catalyst having an Al:U atomic ratio of 9:1. Using this catalyst, the same reaction as in Example IX-1 was carried out. The results are shown in Table IX-2.

This Examples shows that the catalyst of this invention exhibits its superior performance only in the presence of titanium which is the first component of the catalyst of this invention.

Table IX-2

| Reaction temperature (° C) | NO$_x$ reduction rate (%) |
|---|---|
| 200 | 14.6 |
| 250 | 17.7 |
| 300 | 22.5 |
| 350 | 29.4 |
| 400 | 37.0 |
| 450 | 43.2 |
| 500 | 47.1 |
| 550 | 49.3 |

EXAMPLE IX-3

Using each of catalysts prepared in the same way as in Example IX-1 except that the calcining temperature was changed, the same reaction as in Example IX-1 was carried out. The results are shown in Table IX-3.

Table IX-3

| Run No. | Calcining temperature (° C) | Reaction temperature (° C) |  |  |  |  |  |  |  |
|---|---|---|---|---|---|---|---|---|---|
|  |  | 200 | 250 | 300 | 350 | 400 | 450 | 500 | 550 |
|  |  | NO$_x$ reduction rate (%) |  |  |  |  |  |  |  |
| 1 | 400 | 85.6 | 97.8 | 100 | 100 | 100 | 100 | 100 | 97.5 |
| 2 | 600 | 84.7 | 96.6 | 100 | 100 | 100 | 100 | 100 | 98.9 |
| 3 | 700 | 55.0 | 86.1 | 99.3 | 100 | 100 | 100 | 100 | 99.2 |
| 4 | 800 | 17.9 | 35.0 | 73.7 | 95.0 | 98.4 | 98.8 | 97.7 | 77.8 |

EXAMPLE IX-4

A life test for 1000 hours was conducted under the following reaction conditions using 200 ml. of a catalysts having the same composition (Ti:U=8:2) as in Run No. 3 of Example IX-2. The results are shown in Table IX-4.

SV = 10000 hr$^{-1}$
Reaction temperature = 300° C.

| Composition of feed gas | |
|---|---|
| NO | 200 ppm |
| NH$_3$ | 200 to 220 ppm |
| SO$_2$ | 300 ppm |
| SO$_3$ | 5 - 10 ppm |
| O$_2$ | 10.5% |
| H$_2$O | 6.2% |
| N$_2$ | balance |

Catalyst particle diameter = 6 mm
Catalyst length = 4 to 8 mm

Table IX-4

| Time that passed (hours) | NO$_x$ reduction rates (%) |
|---|---|
| 8 | 99.7 |
| 100 | 99.3 |
| 500 | 99.4 |
| 1000 | 99.5 |

X. Ti-W-V TYPE CATALYSTS

EXAMPLE X-1

700 g of titanium tetrachloride (TiCl$_4$) was poured in 4000 ml. of ice water, and 3N ammonia water was added to neutralize the solution. The resulting precipitate was separated by filtration, and washed thoroughly with distilled water. 1986 g of the resulting cake (280 g as TiO$_2$, corresponding to 3.504 mols) was admixed well with a solution of 50.8 g of ammonium paratungstate [5(NH$_4$)$_2$O.12WO$_3$.5H$_2$O] in 1500 ml. of distilled water and a solution of 22.8 g of ammonium meta vanadate [NH$_4$VO$_3$] in 10000 ml. of distilled water, and concurrently, the moisture was evaporated off. The resulting cake was dried, and after adding distilled water, was milled in the wet state for 30 minutes. Then, the mixture was extruded into pellets having a diameter of 6 mm. The resulting molded product was dried, and then calcined at 500° C. for 5 hours in a muffle furnace. The resulting catalyst had a Ti:W:V atomic ratio of 9:0.5:0.5. The catalyst was pulverized to a size of 10 to 20 mesh prior to use.

The reactor used was a quartz reaction tube with an inside diameter of 16.5 mm and including a thermocouple protective tube made of quartz and having an outside diameter of 5 mm. The outside portion of the reaction tube was heated in an electric furnace. The feed gas had the following composition.

| NO | 700 ppm |
|---|---|
| NH$_3$ | 700 to 800 ppm |
| SO$_2$ | 482 ppm |
| O$_2$ | 4% |
| H$_2$O | 7.14% |
| N$_2$ | balance |

This feed gas was passed through the catalyst layer at a space velocity of 50,000 hr$^{-1}$ at varying reaction temperatures. The NO$_x$ reduction rate obtained are shown in Table 1.

EXAMPLE X-2

Using each of catalysts prepared in the same way as in Example X-1 except that the titanium:tungsten:- vanadium atomic ratio was changed, the same reaction as in Example X-1 was carried out. The results are shown in Table X-1.

Table X-1

| Run No. | Atomic ratio Ti:W:V | Reaction temperature (° C) |  |  |  |  |  |  |
|---|---|---|---|---|---|---|---|---|
|  |  | 200 | 250 | 300 | 350 | 400 | 450 | 500 |
| 1 | 9.6:0.2:0.2 | 56.5 | 95.7 | 99.7 | 99.8 | 99.8 | 98.8 | 89.2 |
| 2 | 9.4:0.3:0.3 | 88.6 | 99.4 | 100.0 | 100.0 | 99.7 | 98.6 | 89.7 |
| 3 | 9 :0.2:0.8 | 91.0 | 99.6 | 99.8 | 99.8 | 99.4 | 99.4 | 83.1 |
| 4 | 9 :0.8:0.2 | 81.7 | 98.2 | 100.0 | 100.0 | 100.0 | 99.8 | 91.6 |
| 5 | 8 :1 :1 | 93.3 | 99.5 | 100.0 | 99.8 | 99.6 | 91.4 | 71.2 |
| 6 | 7 :1.5:1.5 | 11.7 | 40.3 | 74.7 | 87.0 | 72.8 | 36.3 | — |

EXAMPLE X-3

Using each of catalysts prepared in the same way as in Example X-1 except that the calcining temperature was changed to 600° and 700° C. respectively, the same reaction as in Example X-1 was carried out. The results obtained are shown in Table X-2.

Table X-2

| Run No. | Calcining temperature (° C) | Reaction Temperature (° C) |  |  |  |  |  |
|---|---|---|---|---|---|---|---|
|  |  | 200 | 250 | 300 | 350 | 400 | 450 |
|  |  | $NO_x$ reduction rate (%) |  |  |  |  |  |
| 1 | 600 | 96.1 | 99.7 | 99.8 | 99.8 | 87.6 | 38.5 |
| 2 | 700 | 10.3 | 22.1 | 56.1 | 95.6 | 93.7 | 53.8 |

EXAMPLE X-4

This Example illustrates the use of vanadyl sulfate ($VOSO_4 \cdot 6H_2O$).

189.7 g of titanium tetrachloride was dissolved in 1000 ml. of ice water, and 3N ammonia water was added to neutralize the solution. The resulting precipitate was separated by filtration, and thoroughly washed with distilled water. 191 g of the resulting cake (26.6 g as $TiO_2$, corresponding to ⅓ mol) was kneaded well with a solution of 4.5g of vanadyl sulfate in 50 ml. of distilled water and a solution of 4.6 g of ammonium paratungstate in 250 ml. of distilled water, and concurrently the moisture was evaporated. The resulting cake was dried, and after adding distilled water, was milled in the wet state for 30 minutes. The milled product was extruded into pellets with a diameter of 6 mm. The molded product was calcined at 400° C. for 5 hours in a muffle furnace. The catalyst so obtained had a Ti:W:V atomic ratio of 9:0.5:0.5. Since the heat decomposition temperature of vanadyl sulfate in air is more than 400° C., the catalyst contains a sulfuric acid radical. The catalyst was pulverized to a size of 10 to 20 mesh, and used in the same reaction as in Example X-1. The results are shown in Table X-3.

Table X-3

| Reaction temperature (° C) | $NO_x$ reduction rate (%) |
|---|---|
| 200 | 96.2 |
| 250 | 99.1 |
| 300 | ca. 100 |
| 350 | ca. 100 |
| 400 | ca. 100 |
| 450 | 97.3 |
| 500 | 88.2 |

EXAMPLE X-5

Using a catalyst prepared in the same way as in Example X-1 except that acid clay was added at the time of milling in an amount such that it became 50% by weight upon calcination in order to improve the moldability of the catalyst composition and increase its strength, the same reaction as in Example X-1 was carried out. The results are shown in Table X-4.

Table X-4

| Catalyst composition | Reaction temperature (° C) |  |  |  |  |  |  |
|---|---|---|---|---|---|---|---|
|  | 200 | 250 | 300 | 350 | 400 | 450 | 500 |
| Acid clay |  |  | $NO_x$ reduction rate (%) |  |  |  |  |
| 50% by weight Ti:W:V = 9:0.5:0.5 | 73.8 | 97.0 | 99.8 | 100.0 | 100.0 | 98.9 | 89.7 |

EXAMPLE X-6

This Example illustrates a life test for prolonged periods of time using an exhaust gas from a fuel oil boiler.

The reactor used had a diameter of 150 mm, and the amount of the catalyst packed was about 5 liters. The catalyst was prepared in the same way as in Example X-1, and molded into tablets having a diameter of 6 mm and a length of 6 mm. Ammonia was added to the exhaust gas to prepare a feed gas of the following composition.

| $NO_x$ | 150 ppm |
|---|---|
| $NH_3$ | 160 to 220 ppm |
| $SO_2$ | 1000 to 1300 ppm |
| $SO_3$ | 30 to 70 ppm |
| $H_2O$ | 8 to 11% |
| $O_2$ | 3 to 6% |
| $CO_2$ | 11 to 14% |
| soot | 60 to 90 mg |
| $N_2$ | balance |

This feed gas was passed through the catalyst layer at a temperature of 300° C. and a space velocity of 10,000 $hr^{-1}$ continuously for 2000 hours. The results obtained are shown in Table X-5.

Table X-5

| Time that passed (hours) | $NO_x$ reduction rate (%) |
|---|---|
| Initial stage | ca. 100 |
| 250 | 99.8 |
| 500 | 99.7 |
| 750 | 99.8 |
| 1000 | 99.8 |
| 1250 | 99.6 |
| 1500 | 99.7 |
| 1750 | 99.7 |
| 2000 | 99.7 |

XI. Ti-W-Mo TYPE CATALYSTS

Example XI-1

A catalyst having a Ti:W:Mo atomic ratio of 9:0.5:0.5 was prepared in the same way as in Example X-1 except that 34.4 g of ammonium paramolybdate [$(NH_4)_6Mo_7O_{24} \cdot 4H_2O$] was used instead of the ammonium metavanadate in Example X-1. Using this catalyst, the same reaction as in Example X-1 was performed. The results are shown in Table 1.

EXAMPLE XI-2

Using each of catalysts prepared in the same way as in Example XI-1 except that the titanium:tungsten:molybdenum atomic ratio was changed, the same reaction as in Example X-1 was performed. The results are shown in Table XI-1.

Table XI-1

| Run No. | Ti:W:Mo | Reaction temperature (° C) | | | | | | |
|---|---|---|---|---|---|---|---|---|
| | | 200 | 250 | 300 | 350 | 400 | 450 | 500 |
| | | NO$_x$ reduction rate (%) | | | | | | |
| 1 | 9:0.8:0.2 | 79.6 | 90.7 | 97.7 | ca100 | ca100 | 98.9 | 91.0 |
| 2 | 9:0.2:0.8 | 82.1 | 96.2 | ca 100 | ca100 | ca100 | 98.3 | 89.8 |
| 3 | 8:1:1 | 83.2 | 92.2 | 98.4 | ca100 | ca100 | 98.0 | 89.7 |

EXAMPLE XI-3

Using each of catalysts prepared in the same way as in Example XI-1 except that the calcining temperature was changed to 600° and 800° C. respectively, the same reaction as in Example X-1 was performed. The results are shown in Table XI-2.

Table XI-2

| Run No. | Calcining temperature (° C) | Reaction temperature (° C.) | | | | | | |
|---|---|---|---|---|---|---|---|---|
| | | 200 | 250 | 300 | 350 | 400 | 450 | 500 |
| | | NO$_x$ reduction rate (%) | | | | | | |
| 1 | 600 | 80.1 | 90.0 | 97.4 | ca. 100 | ca. 100 | 98.1 | 89.3 |
| 2 | 800 | — | 4.7 | 11.8 | 27.6 | 36.3 | 36.8 | 45.7 |

EXAMPLE XI-4

This Example illustrates a lifetime test for prolonged periods of time using an exhaust gas from a fuel oil boiler. The reactor used had a diameter of 150 mm, and the amount of the catalyst packed was about 5 liters. The catalyst was prepared in the same way as in Example XI-1 and molded into tablets having a diameter of 6 mm and a length of 6 mm. Ammonia was added to the exhaust gas to prepare a feed gas of the following composition.

| NO$_x$ | 150 ppm |
|---|---|
| NH$_3$ | 160 to 220 ppm |
| SO$_2$ | 1000 to 1300 ppm |
| SO$_3$ | 30 to 70 ppm |
| H$_2$O | 8 to 11% |
| O$_2$ | 3 to 6% |
| CO$_2$ | 11 to 14% |
| soot | 60 to 90 mg |
| N$_2$ | balance |

This feed gas was passed through the catalyst layer at a temperature of 350° C. and a space velocity of 10,000 hr$^{-1}$ continuously for 2000 hours. The results obtained are shown in Table XI-3.

Table XI-3

| Time that passed (hours) | NO$_x$ reduction rate (%) |
|---|---|
| Initial stage | 98.9 |
| 250 | 99.1 |
| 500 | 99.0 |
| 750 | 98.9 |
| 1000 | 98.8 |
| 1250 | 99.0 |
| 1500 | 98.9 |
| 1750 | 98.7 |
| 2000 | 98.7 |

XII. Ti-W-Fe TYPE CATALYSTS

EXAMPLE XII-1

163 g (26.6 g as TiO$_2$. corresponding to ⅓ mol) of titanium hydroxide obtained in the same way as in Example X-1 was fully kneaded with a solution of 10.88 g of ammonium paratungstate in 500 ml. of distilled water and a solution of 11.58 g of ferrous sulfate (FeSO$_4$.7H$_2$O) in 100 ml. of distilled water, and concurrently, the moisture was evaporated off. The resulting cake was dried, and after adding distilled water, milled for 30 minutes in the wet state, followed by being extruded into pellets having a diameter of 6 mm. The resulting molded product was dried, and calcined at 500° C. for 5 hours in a muffle furnace. The resulting catalyst had a Ti:W:Fe atomic ratio of 8:1:1. The catalyst was pulverized to a size of 10 to 20 mesh. Using this catalyst, the same reaction as in Example X-1 was carried out. The results are shown in Table 1.

Example XII-2

Using each of catalysts prepared in the same way as in Example XII-1 except that the titanium:tungsten:iron atomic ratio was changed, the same reaction as in Example X-1 was carried out. The results are shown in Table XII-1.

Table XII-1

| Run No. | Atomic ratio Ti:W:Fe | Reaction temperature (° C) | | | | | | |
|---|---|---|---|---|---|---|---|---|
| | | 200 | 250 | 300 | 350 | 400 | 450 | 500 |
| | | NO$_x$ reduction rate (%) | | | | | | |
| 1 | 9:0.5:0.5 | 84.2 | 94.8 | 99.2 | 99.8 | 99.8 | 98.5 | 88.2 |
| 2 | 9:0.7:0.3 | 76.0 | 88.0 | 97.0 | 99.6 | 100 | 98.5 | 90.0 |
| 3 | 9:0.3:0.7 | 78.3 | 96.1 | 99.6 | 99.7 | 99.7 | 98.4 | 90.3 |

EXAMPLE XII-3

This Example illustrates a life test for prolonged periods of time using an exhaust gas from a fuel oil boiler. The reactor used had a diameter of 150 mm, and the amount of the catalyst packed was about 5 liters. The catalyst was prepare in the same way as in Example XII-1 and molded into tablets having a diameter of 6 mm and a length of 6 mm. Ammonia was added to the exhaust gas to prepare a feed gas of the following composition.

| NO$_x$ | 150 ppm |
|---|---|
| NH$_3$ | 160 to 220 ppm |
| SO$_2$ | 1000 to 1300 ppm |
| SO$_3$ | 30 to 70 ppm |
| H$_2$O | 8 to 11% |
| O$_2$ | 3 to 6% |
| CO$_2$ | 11 to 14% |
| soot | 60 to 90 mg/Nm$^3$ |
| N$_2$ | balance |

This feed gas was passed through the catalyst layer at a temperature of 350° C. and a space velocity of 10,000 hr$^{-1}$ continuously for 2000 hours. The results obtained are shown in Table XII-2.

Table XII-2

| Time that passed (hours) | NO$_x$ reduction rate (%) |
|---|---|
| Initial stage | ca. 100 |
| 250 | ca. 100 |
| 500 | 99.8 |
| 750 | ca. 100 |
| 1000 | 99.8 |
| 1250 | 99.8 |
| 1500 | 99.7 |
| 1750 | 99.6 |
| 2000 | 99.8 |

XIII. Ti-W-U TYPE CATALYSTS

EXAMPLE XIII-1

189.7 g of titanium tetrachloride ($TiCl_4$) was poured in 1000 ml. of ice water, and 3N ammonia water was added to neutralize the solution. The resulting precipitate was separated by filtration, and thoroughly washed with distilled water. 173.5 g (32.0 g as $TiO_2$, corresponding to 0.4 mol) of the resulting cake was sufficiently kneaded with a solution of 6.14 g of ammonium paratungstate [$5(NH_4)_2.12WO_3.5H_2O$] in 200 ml. of distilled water and a solution of uranyl nitrate [$UO_2(NO_3)_2.6H_2O$] in 50 ml. of distilled water, and concurrently the moisture was evaporated off. The resulting cake was dried, and after adding distilled water, milled in the wet state for 30 minutes, followed by being extruded into pellets having a diameter of 6 mm. The resulting molded product was dried, and calcined at 500° C. for 5 hours in a muffle furnace. The resulting catalyst had a Ti:W:U atomic ratio of 8.5:0.5:1. The catalyst was pulverized to a size of 10 to 20 mesh, and used in the following reaction.

The reactor used was a quartz reaction tube with an inside diameter of 16.5 mm including a thermocouple protective tube made of quartz and having an outside diameter of 5 mm. The outside portion of the reactor was heated by an electric furnace. The feed gas used had the following composition.

| | |
|---|---|
| NO | 600 ppm |
| $NH_3$ | 800 ppm |
| $SO_2$ | 500 ppm |
| $O_2$ | 4% |
| $H_2O$ | 6% |
| $N_2$ | balance |

This feed gas was passed through the catalyst layer at a space velocity of 30,000 $hr^{-1}$ at varying reaction temperatures. The results are shown in Table 1.

EXAMPLE XIII-2

Using each of catalysts prepared in the same way as in Example XIII-1 except that the Ti:W:U atomic ratio was changed, the same reaction as in Example XIII-1 was carried out. The results are shown in Table XIII-1.

Table XIII-1

| Run No. | Ti - W - U atomic ratio | Reaction temperature (° C) | | | | | | | |
|---|---|---|---|---|---|---|---|---|---|
| | | 200 | 250 | 300 | 350 | 400 | 450 | 500 | 550 |
| | | $NO_x$ reduction rate (%) | | | | | | | |
| 1 | 8.9:1:0.1 | 70.4 | 88.7 | 98.8 | 99.6 | 100 | 100 | 100 | 99.2 |
| 2 | 6:1:3 | 40.0 | 79.5 | 98.0 | 100 | 100 | 100 | 98.7 | 87.3 |

EXAMPLE XIII-3

Using each of catalysts prepared in the same way as in Example XIII-1 except that the calcining temperature was changed, the same reaction as in Example XIII-1 was carried out. The results are shown in Table XIII-2.

Table XIII-2

| Run No. | Calcining temperature (° C) | Reaction temperatue (° C) | | | | | | | |
|---|---|---|---|---|---|---|---|---|---|
| | | 200 | 250 | 300 | 350 | 400 | 450 | 500 | 550 |
| | | $NO_x$ reduction rate (%) | | | | | | | |
| 1 | 400 | 90.1 | 99.3 | 100 | 100 | 100 | 100 | 100 | 96.5 |
| 2 | 600 | 94.4 | 99.4 | 100 | 100 | 100 | 100 | 100 | 97.1 |
| 3 | 700 | 91.1 | 99.3 | 100 | 100 | 100 | 100 | 100 | 92.0 |
| 4 | 800 | 38.6 | 81.4 | 97.6 | 100 | 100 | 100 | 99.4 | 95.6 |

EXAMPLE XIII-4

Using 200 ml. of a catalyst having a Ti:W:U atomic ratio of 8.5:0.5:1 prepared in the same way as in Example XIII-1, a feed gas consisting of 200 ppm of NO, 200 to 220 ppm of $NH_3$, 300 ppm of $SO_2$, 5 to 10 ppm of $SO_3$, 10.5% of $O_2$, 6.2% of $H_2O$, and the balance being $N_2$ was passed through the catalyst layer at a temperature of 280° C. and a space velocity of 10,000 $hr^{-1}$. The catalyst particles had a diameter of 6 mm and a length of 4 to 8 mm. The test was performed for 1000 hours. The results are shown in Table XIII-3.

Table XIII-3

| Time that passed (hours) | $NO_x$ reduction rate (%) |
|---|---|
| 8 | 99.7 |
| 100 | 99.4 |
| 500 | 99.6 |
| 1000 | 99.5 |

XIV. Ti-V-Mo TYPE CATALYSTS 100 g of a slurry containing 40% by weight of metatitanic acid was well kneaded with 3.3 g of ammonium metavanadate and 4.9 g of ammonium molybdate. The mixture was dried at 120° C. for about 4 hours, and mixed well with 3% by weight of graphite. The mixture was molded at a molding pressure of about 0.5 ton/$cm^2$ into tablets having a thickness of 6 mm and a diameter of 6 mm. The resulting molded article was calcined at 500° C. for 2 hours. The resulting catalyst had a Ti:V:Mo atomic ratio of 9:0.5:0.5.

The catalyst activity tester was of an ordinary flowing type, and the reaction tube used was made of quartz and included a thermocouple protective tube made of quartz and having an outside diameter of 5 mm. The reaction tube was heated in an electric furnace, and the reaction temperature was prescribed. 4ml. of the catalyst adjusted to a size of 10 to 20 mesh was packed in the reaction tube, and a feed gas consisting of 280 to 320 ppm of NO, 280 to 320 ppm of $NH_3$, 450 to 550 ppm of $SO_2$, 2 to 4% of $O_2$, 10 to 13% of $CO_2$, 12 to 16% of $H_2O$ and the balance being $N_2$ was passed through the catalyst layer at a space velocity of 10000 $hr^{-1}$. The results obtained are shown in Table 1.

EXAMPLE XIV-2

Using each of catalysts prepared in the same way as in Example XIV-1 except that the titanium:vanadium:- molybdenum atomic ratio was changed, the same feed gas as used in Example XIV-1 was passed through the catalyst layer at a space velocity of 50000 hr$^{-1}$. The results are shown in Table XIV-1.

Table XIV-1

| Run No. Reaction Temperature (° C) | Ti:V:Mo atomic ratio | 1 9:0.5:0.5 | 2 8.9:0.1:1 | 3 8:0.5:1.5 | 4 7:1:2 | 5 6:1:3 |
|---|---|---|---|---|---|---|
| | | NO$_x$ reduction ratio (%) | | | | |
| 200 | | 83 | 82 | 82 | 82 | 75 |
| 250 | | 94 | 91 | 93 | 92 | 83 |
| 300 | | >99 | 97 | >99 | 96 | 87 |
| 350 | | >99 | >99 | >99 | 96 | 87 |
| 400 | | >99 | >99 | >99 | 95 | 88 |
| 450 | | >99 | >99 | >99 | 90 | 85 |
| 500 | | 85 | 90 | 92 | 80 | 75 |

EXAMPLE XIV-3

This Example illustrates a life test for prolonged period of time using an exhaust gas from a fuel oil boiler. The reactor used had a diameter of 150 mm, and about 5 liters of cylindrical particles of catalyst with diameter of 6 mm and a length of 6 mm were packed in the reactor. Ammonia was added to the exhaust gas to prepare a feed gas of the following composition.

| NO$_x$ | 150 to 210 ppm |
|---|---|
| NH$_3$ | 160 to 200 ppm |
| SO$_2$ | 1000 to 1300 ppm |
| SO$_3$ | 30 to 70 ppm |
| H$_2$O | 8 to 11% |
| O$_2$ | 3 to 6% |
| CO$_2$ | 11 to 14% |
| soot | 60 to 90 mg/Nm$^3$ |
| N$_2$ | balance |

The above feed gas was reacted at a temperature of 350° ± 10° C. and a space velocity of 10,000 hr$^{-1}$ continuously for 2000 hours. The results are shown in Table XIV-2.

Table XIV-2

| Time that passed (hours) | NO$_x$ reduction rate (%) |
|---|---|
| Initial stage | >99 |
| 250 | >99 |
| 500 | 99 |
| 750 | 98 |
| 1000 | 97 |
| 1250 | 97 |
| 1500 | 98 |
| 2000 | 97 |

XV. Ti-V-Fe TYPE CATALYSTS

EXAMPLE XV-1

Using a catalyst having a Ti:V:Fe atomic ratio of 9:0.5:0.5 prepared by the same method as in Example XIV-1 except that a precipitate of iron hydroxide formed by adding ammonia water dropwise to a solution of ferrous sulfate instead of ammonium molybdate and molybdenum was replaced by iron, the same reaction as in Example XIV-2 was carried out. The results are shown in Table 1.

EXAMPLE XV-2

Using each of catalysts prepared in the same way as in Example XV-1 except that the Ti:V:Fe atomic ratio was varied, the same reaction as in Example XIV-1 was carried out. The results are shown in Table XV-1.

Table XV-1

| Run No. Reaction temperature (° C) | Ti:V:Fe atomic ratio | 1 8.9:0.1:1 | 2 8:0.5:1.5 | 3 7:0.5:2.5 | 4 6:1:3 |
|---|---|---|---|---|---|
| | | NO$_x$ reduction rate (%) | | | |
| 200 | | 76 | 82 | 86 | 86 |
| 250 | | 93 | 96 | 95 | 94 |
| 300 | | >99 | >99 | >99 | >99 |
| 350 | | >99 | >99 | >99 | >99 |
| 400 | | >99 | >99 | >99 | >99 |
| 450 | | 95 | 95 | 93 | 94 |
| 500 | | 84 | 80 | 77 | 74 |

EXAMPLE XV-3

This Example illustrate a life test for prolonged periods of time using an exhaust gas from a fuel oil boiler. The reactor used had a diameter of 150 mm, and about 5 liters of cylindrical catalyst particles with a diameter of 6 mm and a height of 6 mm were packed into the reactor. Ammonia was added to the exhaust gas to prepare a feed gas of the following composition.

| NO$_x$ | 150 to 210 ppm |
|---|---|
| NH$_3$ | 160 to 200 ppm |
| SO$_2$ | 1000 to 1300 ppm |
| SO$_3$ | 30 to 70 ppm |
| H$_2$O | 8 to 11% |
| O$_2$ | 3 to 6% |
| CO$_2$ | 11 to 14% |
| soot | 60 to 90 mg/Nm$^3$ |
| N$_2$ | balance |

This feed gas was passed through the catalyst layer at a reaction temperature of 350° ± 10° C. and a space velocity of 10000 hr$^{-1}$ continuously for 2000 hours. The catalyst used was the same as that used in Example XV-1, and the results obtained are shown in Table XV-2.

Table XV-2

| Time that passed (hours) | NO$_x$ reduction rate (%) |
|---|---|
| Initial stage | >99 |
| 250 | >99 |
| 500 | 98 |
| 750 | 97 |
| 1000 | 96 |
| 1250 | 96 |
| 1500 | 97 |
| 2000 | 96 |

TABLE 5

Table 5 shows catalyst composed of components A and B other than those so far cited. These catalysts were prepared in the same way as in Example X-1, and the reaction conditions are as follows:

| Reaction conditions | |
|---|---|
| SV = 20000 hr$^{-1}$ | catalyst particle diameter = 10 – 20 mesh |
| NO = 600 ppm | |
| NH$_3$ = 900 ppm | |
| SO$_2$ = 450 ppm | |
| O$_2$ = 4% | |
| H$_2$O = 6.3% | |
| N$_2$ = balance | |

Table 5

| Run No. | Catalyst composition | | Reaction temperature (° C) | NO$_x$ reduction rate (%) |
|---|---|---|---|---|
| 1 | Ti-W-Cu= | 8.9:1:0.1 | 350 | 99.7 |
| 2 | Ti-W-Co= | " | " | 96.5 |
| 3 | Ti-W-Ni= | " | " | 97.3 |
| 4 | Ti-W-Cr= | " | " | 96.3 |
| 5 | Ti-W-Sn= | " | " | 95.1 |
| 6 | Ti-U-Mo= | 9:0.5:0.5 | 300 | 100 |
| 7 | Ti-U-Cu= | " | " | 99.2 |
| 8 | Ti-U-V= | " | " | 100 |
| 9 | Ti-U-Cr= | " | " | 99.6 |
| 10 | Ti-Mo-Fe= | " | " | 98.0 |

XVI. Ti-W-Mo-V TYPE CATALYSTS

EXAMPLE XVI-1

163 g (26.6 g as TiO$_2$, corresponding to ⅓ mol) of titanium hydroxide prepared in the same as in Example X-1 was well admixed with a solution of 5.1 g of ammonium paratungstate, 2.3 g of ammonium metavanadate and 3.5 g of ammonium paramolybdate in distilled water, and concurrently the moisture was evaporated off. The resulting cake was dried, and treated in the same aay as in Example X-1 to prepare a catalyst having a Ti:W:Mo:V atomic ratio of 8.5:0.5:0.5:0.5. Using this catalyst, the same reaction as in Example X-1 was carried out. The results are shown in Table 1.

XVII. Ti-V-Sn TYPE CATALYSTS

EXAMPLE XVII-1

1Kg of titanium tetrachloride (TiCl$_4$) was dissolved in 1 liter of distilled water, and 3N ammonia water was added to neutraize the solution. The resulting precipitate was dehydrated by means of a centrifugal separator using a 300-mesh filter cloth, and washed four times with 5 liters of distilled water. 185.8 g of titanium hydroxide obtained (31.96 g as TiO$_2$, as determined by the ignition loss method) was admixed with a solution of 2.5 g of ammonium metavanadate (NH$_4$VO$_3$) in 200 ml. of distilled water and a solution of 0.45 g of stannous sulfate (SnSO$_4$) in 10 ml. of 0,5 N sulfuric acid to which 4.5 ml. of 3N aqueous ammonia was added. With sufficient stirring, the solution was evaporated and concentrated. The residue was made into an extrudable paste by milling in the wet state using a mixer, and extruded into pellets having a diameter of 6 mm. The resulting molded product was dried, and calcined at 500° C. for 5 hours.

The resulting catalyst had a Ti:V:Sn atomic ratio of 9.45:0.5:0.5. The catalyst was pulverized to a size of 10 to 20 mesh, and used in the following reaction.

Reaction conditions

SV= 50,000 hr$^{-1}$
NO 630 ppm

| | |
|---|---|
| NH$_3$ | 920 ppm |
| SO$_2$ | 370 ppm |
| O$_2$ | 4% |
| H$_2$O | 6.4% |
| N$_2$ | balance |

Reactor

Inside diameter: 16.5 mm, made of quartz including a thermocouple protective tube with an outside diameter of 5 mm.

The results obtained are shown in Table 1.

XVIII. Ti-Mo-V-Sn TYPE CATALYSTS

EXAMPLE XVIII-1

1 Kg of titanium tetrachloride (TiCl$_4$) was dissolved in 1 liter of distilled water, and 3N ammonia water was added to neutralize the solution. The resulting precipitate was dehydrated by means of a centrifugal separator using a 300-mesh filter cloth, and washed four times with 5 liters of distilled water. 185.8 g (31.96 g as TiO$_2$, as determined by the ignition loss method) was admixed with a solution of 3.95 g of ammonium paramolybdate [(NH$_4$)$_6$Mo$_7$O$_{24}$.4H$_2$O] and 2.61 g of ammonium metavanadate (NH$_4$VO$_3$) in 200 ml. of distilled water. Furthermore, a suspension obtained by dissolving 0.48 g of stannous sulfate (SnSO$_4$) in 10 ml. of 0.5N sulfuric acid and then adding 4.5 ml. of aqueous ammonia was added. The mixture was evaporated and concentrated with stirring, and wet milled by a mixer to form it into an extrudable paste. The past was extruded into pellets each having a diameter of 6 mm. The resulting molded product was dried, and calcined at 500° C. for 5 hours in a muffle furnace.

The resulting catalyst had a Ti:Mo:V:Sn atomic ratio of 9.85:0.5:0.5:0.05. The catalyst was pulverized to a size of 10 to 20 mesh, and used in the following reaction.

Reaction conditions

SV = 50000 hr$^{-1}$
NO = 700 ppm
NH$_3$ = 1000 ppm
SO$_2$ = 440 ppm
O$_2$ = 4%
H$_2$O = 6.7%
N$_2$ = balance Reaction tube Inside diameter of 16.5 mm, quartz, including a thermocouple protective tube with an outside diameter of 5 mm; the results obtained are shown in Table 1.

XIX. Ti-W-V-Sn TYPE CATALYSTS

EXAMPLE XIX-1

800 g of titanium tetrachloride was poured in 4000 ml. of ice water. 3N aqueous ammonia was added to neutralize the solution. The resulting precipitate was separated by filtration and thoroughly washed with water. 1644 g (319.6 g as TiO$_2$, corresponding to 4 mols) of the resulting cake was taken (sol A).

58.34 g of ammonium paratungstate [5(NH$_4$)$_2$O 12WO$_3$.5H$_2$O] and 26.14 g of ammonium metavanadate (NH$_4$VO$_3$) were dissolved in 800 ml. of distilled water (solution B). way Aqueous ammonia was added to an aqueous solution of 7.83 g of stannic chloride (SnCl$_4$.55H$_2$O) in 30 ml. of distilled water to adjust the pH of the solution to 7. The resulting precipitate was added to the solution B, and the mixture obtained by stirring was added to the sol. A.

The mixture was concentrated to dryness, and after adding a small amount of water, was milled in the wet state using a mixer to form it into an extrudable paste. The paste was extruded into the form of macaroni with an outside diameter of 6 mm and an inside diameters of 3 mm.

The resulting molded product was dried, and calcined at 500° C. for 5 hours in a muffle furnace.

The resulting catalyst had a Ti:W:Sn atomic ratio of 8.95:0.5:0.05.

The catalyst was pulverized to a size of 10 to 20 mesh, and used in the following reaction.

The reaction tube was a quartz reaction tube with an inside diameter of 16.5 mm including a thermocouple protective tube made of quartz and having an outside diameter of 5 mm. The outside portion of the reaction tube was heated by an electric furnace. The feed gas used had the following composition.

| | |
|---|---|
| NO | 640 ppm |
| $NH_3$ | 670 ppm |
| $SO_2$ | 400 ppm |
| $O_2$ | 4% |
| $H_2O$ | 6.25% |
| $N_2$ | balance |

The feed gas was passed through the catalyst layer at a space velocity of 50000 $hr^{-1}$. The results obtained are shown in Table 1.

EXAMPLE XIX-2

The macaroni-shaped catalyst prepared in Example XIX-1 was cut to a length of 4 to 8 mm, and used in the following reaction.

The reaction tube used had an inside diameter of 35.7 mm and a length of 420 mm and was made of stainless steel. At the central part a thermocouple protective tube of stainless steel make was provided. The outside portion of the reaction tube was heated in an electric furnace. 200 ml. of the catalyst was packed into the reactor.

The feed gas was obtained by adding nitrogen oxide, ammonia, sulfur dioxide and sulfur trioxide to an exhaust gas from a boiler, and had the following composition.

| | |
|---|---|
| $NO_x$ | 200 to 230 ppm |
| $SO_2$ | 300 ppm |
| $NH_3$ | 210 to 240 ppm |
| $SO_3$ | 5 to 10 ppm (obtained by air-oxidation of $SO_2$) |
| $O_2$ | 11.5% |
| $H_2O$ | 6.6% |
| $CO_2$ | 4.7% |
| $N_2$ | balance |

This gas was passed through the catalyst layer at a space velocity of 10000 $hr^{-1}$ and a reaction temperature of 250° C. continuously for 2000 hours. The results obtained are shown in Table XIX-1.

CT XIX-1

Using a catalyst having a Ti:W:V atomic ratio of 9:0.5:0.5 prepared in the same way as in Example XIX-1 except that tin was not used, the same reaction as in Example XIX-1 was carried out for comparison. The results are also shown in Table XIX-1.

Table XIX-1

| Example NO | XIX-2 | CT-XIX-1 |
|---|---|---|
| time elapsed (hr) | $NO_x$ reduction rate (%) | |
| 5 | 95.2 | 96.1 |
| 25 | 94.0 | 93.3 |
| 50 | 95.8 | 85.3 |
| 75 | 96.1 | 77.5 |
| 100 | 95.0 | 51.1 |
| 500 | 95.5 | — |
| 1000 | 95.8 | — |
| 2000 | 96.0 | — |

EXAMPLE XIX-3

This Example illustrate the effect of the amount of Sn added.

Catalysts having the compositions shown in Table XIX-2 were prepared in the same way as in Example XIX-1 by increasing the amount of tin but decreasing the amount of titanium. Using these catalysts, the same catalyst life test as in Example XIX-2 was carried out for 500 hours. The results are shown in Table XIX-2.

Table XIX-2

| Run No. | Catalyst composition | | | | Time that passed (hours) and $NO_x$ reduction rate (%) | | | | |
|---|---|---|---|---|---|---|---|---|---|
| | Ti | W | V | Sn | 100 hr | 200 | 300 | 400 | 500 |
| 1 | 8.5 | 0.5 | 0.5 | 0.5 | 93.3% | 91.3 | 92.8 | 93.0 | 93.0 |
| 2 | 8.75 | 0.5 | 0.5 | 0.25 | 96.6 | 96.0 | 94.8 | 95.3 | 94.8 |
| 3 | 8.9 | 0.5 | 0.5 | 0.1 | 95.5 | 95.7 | 93.8 | 94.1 | 94.4 |
| 4 | 8.99 | 0.5 | 0.5 | 0.01 | 96.3 | 93.3 | 91.2 | 90.3 | 88.6 |

We claim:

1. A process for reducing nitrogen oxides to nitrogen, which comprises adding ammonia, as substantially the sole reducing agent, to a gaseous mixture containing nitrogen oxides and molecular oxygen, and contacting the resulting gaseous mixture containing nitrogen oxides, molecular oxygen and ammonia, as substantially the sole reducing agent, at a temperature of 150° to 550° C. and at a space velocity of 1,000 to 100,000/hour with a catalyst composition consisting essentially of an intimate mixture of the following components in the following atomic ratios: (A) one atom of titanium (Ti) as component A, (B) 0.01 to 1 atom of at least one metal selected from the following groups B-1 and B-2 wherein group B-1 consists of iron (Fe) and vanadium (V) and group B-2 consists of molybdenum (Mo), tungsten (W), nickel (Ni), cobalt (Co), copper (Cu), chromium (Cr), and uranium (U), with the proviso that when vanadium (V) is selected from group B-1, at least one of molybdenum (Mo) and tungsten (W) from group B-2 is also present in the catalyst composition, and optionally (C) tin (Sn) as component C, and (D) at least one metal as component D selected from the group consisting of silver (Ag), beryllium (Be), magnesium (Mg), zinc (Zn), boron (B), aluminum (Al), yttrium (Y), rare earth elements, silicon (Si), niobium (Nb), antimony (Sb), bismuth (Bi), and manganese (n), wherein when said catalyst composition includes optional component C, it is present in an atomic ratio of component A to component C of 1:003 – 0.2 and said optional component D being present at an atomic ratio of component A to component D of 1:0 – 0.15, said elements of component A, B-2, C and D being contained in said catalyst in the form of oxides, and the iron and vanadium of component B-1 being contained in said catalyst in the form of oxides and/or sulfates.

2. The process according to claim 1, in which the temperature is within the range of 200°–500° C.

3. The process according to claim 1, in which the gaseous mixture contains, per mol of the nitric oxide (NO) which is present therein, one-fourth molar times thereof of molecular oxygen.

4. The process according to claim 1, in which ammonia is used at a ratio of 0.5 – 10 molar times the nitrogen oxide ($NO_x$) present in the gaseous mixture.

5. The process of claim 1 wherein an exhaust gas comprising nitrogen oxides and ammonia are both contacted with a catalyst selected from the group consisting of A. a catalyst consisting essentially of titanium and molybdenum as active ingredients.

B. a catalyst consisting essentially of titanium and tungsten as main ingredients, C. a catalyst consisting essentially of titanium and iron as active ingredients, D. a catalyst consisting essentially of (1) titanium, (2) tungsten, and (3) at least one of vanadium, molybdenum and iron, and E. a catalyst consisting essentially of titanium, tungsten, vanadium and tin.

6. The process of claim 1 wherein the catalyst composition consisting essentially of an intimate mixture of A. titanium as component A, with B. at least one metal selected from the group consisting molybdenum, tungsten, iron and vanadium, as component (B), in the form of their oxides with the proviso that when vanadium is present in the catalyst composition, at least one of the molybdenum and tungsten is also present.

7. The process of claim 1 wherein the catalyst composition consisting essentially of an intimate mixture of at least three metals, in the form of their oxides, of A. titanium as component A, tungsten as the first component B, and at least one metal selected from the group consisting of vanadium, molybdenum, iron, and uranium, as second component B.

8. The process of claim 1 wherein the catalyst composition consists essentially of an intimate mixture of at least three metals, in the form of their oxides, of A. titanium as component A, molybdenum as the first component B, and at least one metal selected from the group consisting of vanadium and iron, as second component B.

9. The process of claim 1 wherein the catalyst composition contains tin as the component C at the atomic ratio to the titanium of 0.0005 – 0.8 : 1.

* * * * *

UNITED STATES PATENT OFFICE
CERTIFICATE OF CORRECTION

PATENT NO. : 4,085,193
DATED : April 18, 1978
INVENTOR(S) : NAKAJIMA, ET AL.

It is certified that error appears in the above-identified patent and that said Letters Patent are hereby corrected as shown below:

Item [30], correct Foreign Application Priority Data to read as follows:

```
-- Dec. 12, 1973   Japan ..................... 48-137685
   Dec. 12, 1973   Japan ..................... 48-137686
   Dec. 12, 1973   Japan ..................... 48-137687
   Dec. 12, 1973   Japan ..................... 48-137688
   Mar. 29, 1974   Japan ..................... 49-35246
   Mar. 29, 1974   Japan ..................... 49-35247
   Aug. 16, 1974   Japan ..................... 49-93979
   Aug. 16, 1974   Japan ..................... 49-93980
   Aug. 22, 1974   Japan ..................... 49-96528  --
```

Signed and Sealed this

Nineteenth Day of September 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,085,193
DATED : April 18, 1978
INVENTOR(S) : NAKAJIMA, ET AL.

It is certified that error appears in the above-identified patent and that said Letters Patent are hereby corrected as shown below:

Column 3, line 38, delete "108°", insert -- 180° --

Column 21, line 43, Run No. 2 column of Table II-1, delete "5.29", insert -- 52.9 --

Columns 35-36, line 46, Example No. CT V-1 column of Table V-2, delete "$TiO_3$", insert -- $TiO_2$ --

Signed and Sealed this

*Twentieth* Day of *March 1979*

[SEAL]

*Attest:*

RUTH C. MASON
*Attesting Officer*

DONALD W. BANNER
*Commissioner of Patents and Trademarks*